United States Patent
Xu

(10) Patent No.: US 11,972,205 B2
(45) Date of Patent: Apr. 30, 2024

(54) METHOD, APPARATUS AND STORAGE MEDIUM FOR LOADING MESSAGE INTO TARGET POSITION IN TARGET DOCUMENT

(71) Applicant: Tencent Technology (Shenzhen) Company Limited, Shenzhen (CN)

(72) Inventor: Qiaoyun Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/881,494

(22) Filed: Aug. 4, 2022

(65) Prior Publication Data
US 2022/0374589 A1    Nov. 24, 2022

Related U.S. Application Data

(63) Continuation of application No. PCT/CN2021/101536, filed on Jun. 22, 2021.

(30) Foreign Application Priority Data

Jul. 24, 2020 (CN) .......................... 202010723864.1

(51) Int. Cl.
G06F 40/00 (2020.01)
G06F 40/106 (2020.01)
G06F 40/18 (2020.01)

(52) U.S. Cl.
CPC ............ G06F 40/18 (2020.01); G06F 40/106 (2020.01)

(58) Field of Classification Search
CPC .................................. G06F 40/18; G06F 40/106
See application file for complete search history.

(56) References Cited

U.S. PATENT DOCUMENTS 7,853,888 B1 * 12/2010 Dhawan .............. G06F 3/04817
715/838
8,666,961 B1 3/2014 Qureshi et al.
(Continued)

FOREIGN PATENT DOCUMENTS

CN     103458007 A    12/2013
CN     106445900 A     2/2017
(Continued)

OTHER PUBLICATIONS

How to Transfer Text Messages to Excel Files, Archive retrieved at https://web.archive.org/web/20200929111044/https://www.iskysoft.com/mobile-tips/transfer-text-messages-to-excel-files.html (Year: 2020).*

(Continued)

*Primary Examiner* — Barbara M Level
(74) *Attorney, Agent, or Firm* — Morgan, Lewis & Bockius LLP

(57) ABSTRACT

Embodiments of this application provide an information processing method performed by a computer device. In the embodiments of this application, the information processing method includes: displaying session information in a session interface, the session information including a plurality of messages; responding to a touch operation for one of the plurality of messages of the session information, and displaying a target document corresponding to the session interface; acquiring a target document position in the target document; and loading at least the one of the plurality of messages of the session information into the target document position of the target document.

15 Claims, 16 Drawing Sheets

(56) References Cited

U.S. PATENT DOCUMENTS

| | | | |
|---|---|---|---|
| 9,544,359 B1* | 1/2017 | Hunt | H04L 67/10 |
| 11,087,080 B1* | 8/2021 | Yousaf | G06F 40/18 |
| 2005/0004986 A1* | 1/2005 | Aoki | G06F 9/543 |
| | | | 709/206 |
| 2005/0172241 A1* | 8/2005 | Daniels | G06F 9/543 |
| | | | 715/770 |
| 2005/0177573 A1* | 8/2005 | Gauthier | G06F 40/18 |
| 2012/0151315 A1* | 6/2012 | Campbell | G06F 40/205 |
| | | | 715/212 |
| 2014/0095673 A1* | 4/2014 | Mao | H04L 67/02 |
| | | | 709/219 |
| 2014/0327626 A1* | 11/2014 | Harrison | G06F 3/04883 |
| | | | 345/173 |
| 2016/0224549 A1 | 8/2016 | Park | |
| 2017/0255596 A1* | 9/2017 | Rochelle | H04L 51/00 |
| 2018/0174356 A1* | 6/2018 | You | G06T 15/20 |
| 2020/0014641 A1* | 1/2020 | Kwon | H04L 51/216 |
| 2020/0371647 A1* | 11/2020 | Gerges | G06F 40/151 |
| 2021/0042171 A1* | 2/2021 | Shah | G06F 9/543 |

FOREIGN PATENT DOCUMENTS

| | | |
|---|---|---|
| CN | 108112270 A | 6/2018 |
| CN | 109492208 A | 3/2019 |
| CN | 109710155 A | 5/2019 |
| CN | 109842544 A | 6/2019 |
| CN | 110275871 A | 9/2019 |
| CN | 110278141 A | 9/2019 |
| CN | 110752984 A | 2/2020 |
| CN | 111324266 A | 6/2020 |
| CN | 112637039 A | 4/2021 |

OTHER PUBLICATIONS

Tencent Technology, WO, PCT/CN2021/101536, Sep. 1, 2021, 4 pgs.

Tencent Technology, IPRP, PCT/CN2021/101536, Jan. 24, 2023, 5 pgs.

Tencent Technology, ISR, PCT/CN2021/101536, Sep. 27, 2021, 2 pgs.

* cited by examiner

FIG. 7C – cont'd

09:41

Tencent document user feedback
Cancel    (... group in March)    Complete

| | A | B | C |
|---|---|---|---|
| 1 | User feedback quote | Question classification | Person in charge of QA |
| 2 | Xiao Xu<br>The hyperlink is invalid after the table is exported<br><br>+1 I had the same problem. I exported the table and opened it with WPS on the computer, only to find that ... | | |
| 3 | Hello, I just got stuck and the content was lost<br><br>Sorry, please send us your account number and document link<br>Our developer will troubleshoot the problem.<br>Hold on | | |
| 4 | Xu Qiaoyun<br>Is the picture picker updated? There is something wrong with this icon<br><br>Is this a standalone app or a mini program to open?<br>The mini program has been updated recently.<br>I'll show the developer | | |
| 5 | Zheng Yu<br>Excuse me, the content cannot be displayed normally when the QQ browser opens documents and tables. Is there any setting problem?<br>Mengmeng<br>Sorry, please send your account number and document... | | |

Double click/tap

+ ≡  Bug-class user feedback    Experience suggestions    Processed

FIG. 7E

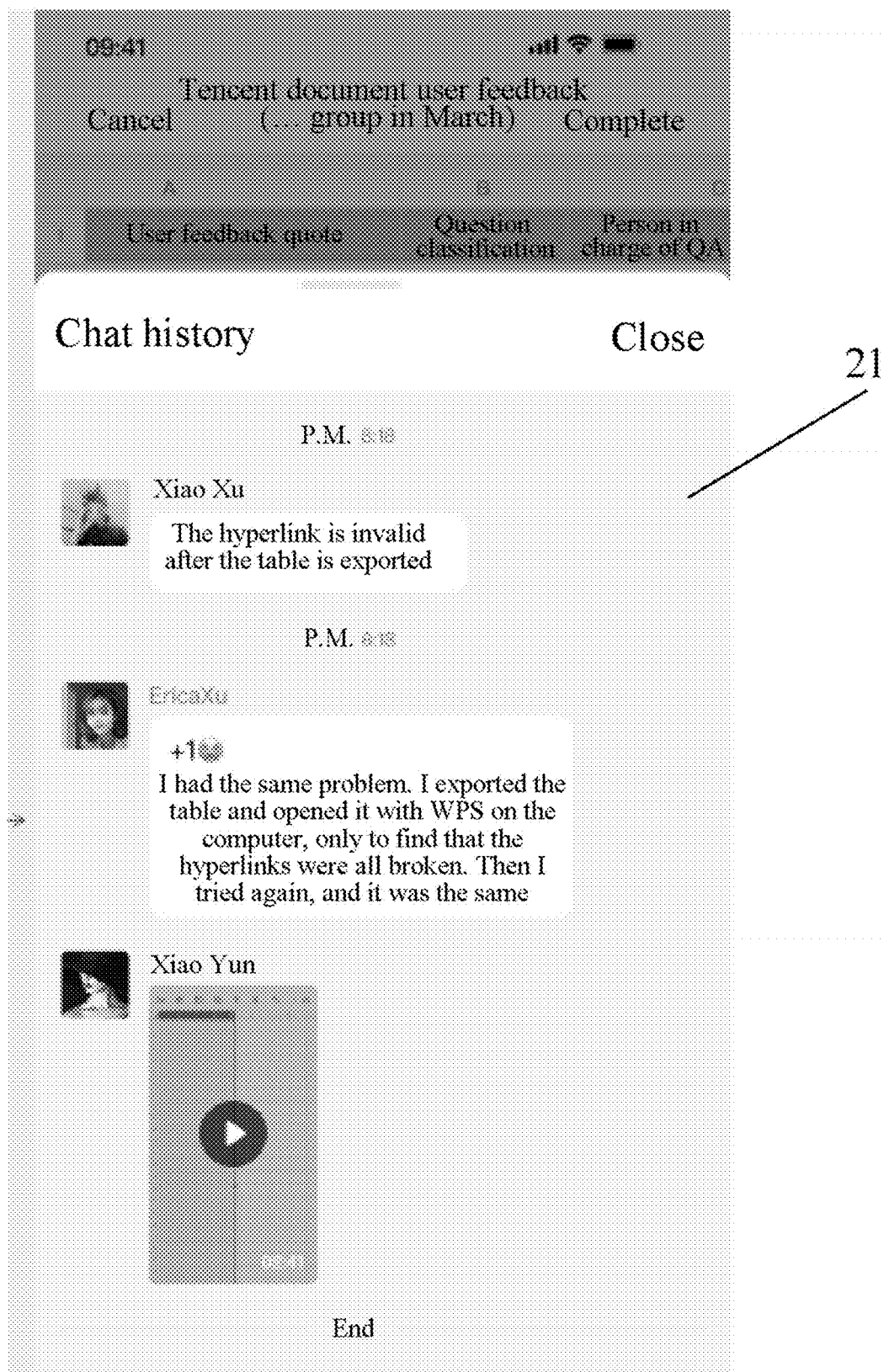
FIG. 7E – cont'd

FIG. 7F

METHOD, APPARATUS AND STORAGE MEDIUM FOR LOADING MESSAGE INTO TARGET POSITION IN TARGET DOCUMENT

CROSS-REFERENCE TO RELATED APPLICATIONS

This application is a continuation application of PCT Patent Application No. PCT/CN2021/101536, entitled "INFORMATION PROCESSING METHOD AND APPARATUS, COMPUTER DEVICE AND STORAGE MEDIUM" filed on Jun. 22, 2021, which claims priority to Chinese Patent Application No. 202010723864.1, filed with the State Intellectual Property Office of the People's Republic of China on Jul. 24, 2020, and entitled "INFORMATION PROCESSING METHOD AND APPARATUS, AND STORAGE MEDIUM", all of which are incorporated herein by reference in their entirety.

FIELD OF THE TECHNOLOGY

This application relates to the technical field of communications, and in particular, to an information processing method and apparatus, a computer device, and a storage medium.

BACKGROUND OF THE DISCLOSURE

With the continuous popularization and development of terminals, users increasingly rely on the terminals. A variety of applications may be installed on the terminals, among which Instant Messaging (IM) applications have been widely used. The users can communicate with friends in real time through the IM applications. For example, the users can transmit and receive IM messages in real time and interact with the friends in chat scenarios.

In the related art, in a chat scenario of a session window, when a user wants to edit and collate IM messages, the user is required to manually select IM messages for replication, and then open a document file to paste the IM messages to the document file for typesetting.

However, the process of editing and collating the IM messages in the related art is rather cumbersome. For example, editing and collating a plurality of IM messages requires multiple copy and paste operations, resulting in inefficient information processing.

SUMMARY

Embodiments of this application provide an information processing method and apparatus, a computer device, and a storage medium.

To resolve the foregoing technical problem, the embodiments of the present application provide the following technical solutions.

An information processing method performed by a computer device is provided, and the method includes:
  displaying session information in a session interface, the session information including a plurality of messages;
  responding to a touch operation for one of the plurality of messages of the session information, and displaying a target document corresponding to the session interface;
  acquiring a target document position in the target document; and
  loading at least the one of the plurality of messages of the session information into the target document position of the target document.

An information processing apparatus, including:
  a display unit configured to display session information in a session interface, the session information including a plurality of messages;
  a response unit configured to respond to a touch operation for one of the plurality of messages of the session information, and display a target document corresponding to the session interface;
  an acquisition unit configured to acquire a target document position in the target document; and
  a loading unit configured to load at least the one of the plurality of messages of the session information into the target document position of the target document.

A computer device, including a memory and one or more processors, the memory storing computer-readable instructions, the computer-readable instructions, when executed by the one or more processors, causing the one or more processors to perform steps of the information processing method described above.

One or more non-transitory computer-readable storage media storing computer-readable instructions, the computer-readable instructions, when executed by one or more processors, causing the one or more processors to perform steps of the information processing method described above.

A computer program product or computer program, the computer program product or computer program including computer-readable instructions, the computer-readable instructions being stored in a computer-readable storage medium, a processor of a computer device reading the computer-readable instructions from the computer-readable storage medium, and the processor executing the computer-readable instructions to cause the computer device to perform steps of the information processing method described above.

BRIEF DESCRIPTION OF THE DRAWINGS

To describe the technical solutions in the embodiments of this application more clearly, the following briefly describes accompanying drawings required for describing the embodiments. Apparently, the accompanying drawings in the following description show merely some embodiments of this application, and a person skilled in the art may still derive other drawings from these accompanying drawings without creative efforts.

FIG. 7E is another schematic diagram of the information processing interface according to an embodiment of this application.

FIG. 7F is another schematic diagram of the information processing interface according to an embodiment of this application.

DESCRIPTION OF EMBODIMENTS

The technical solutions in the embodiments of this application are clearly and completely described in the following with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

Figure 1A:
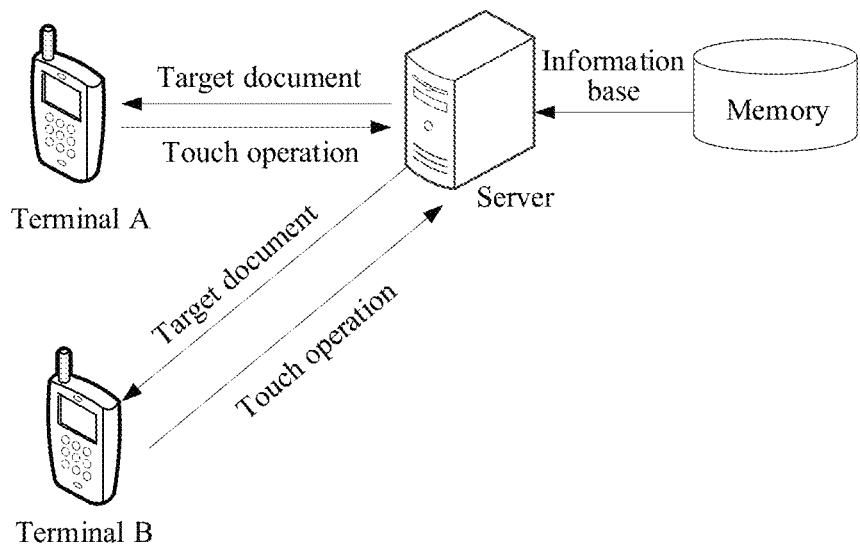
FIG. 1A is a schematic diagram of a scenario of an information processing system according to an embodiment of this application.
Figure 1B:
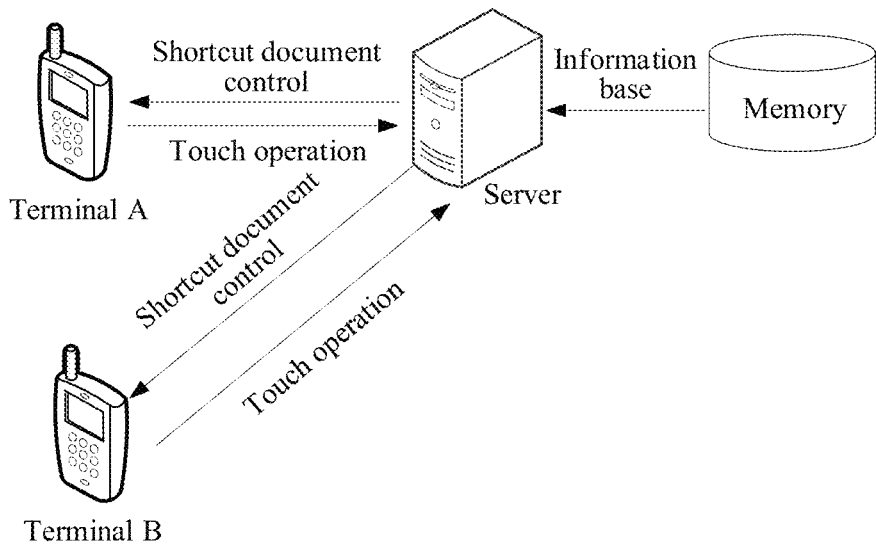
FIG. 1B is a schematic diagram of a scenario of an information processing system according to an embodiment of this application.

Embodiments of this application provide an information processing method and apparatus, a computer device, and a storage medium. Referring to FIG. 1A and FIG. 1B, FIG. 1A and FIG. 1B are schematic diagrams of scenarios of an information processing system according to embodiments of this application, including: Terminal A, Terminal B, and a server (the processing system may further include other terminals in addition to Terminal A and Terminal B, and a specific quantity of the terminals is not limited herein). Terminal A and the server and Terminal B and the server may be connected through a communication network. The communication network may include a wireless network and a wired network. The wireless network includes one or any combination of a wireless wide area network, a wireless local area network, a wireless metropolitan area network, and a wireless personal area network. The network includes network entities such as a router and a gateway, which are not shown in the figure. Terminal A and Terminal B may exchange information with the server through the communication network. For example, as shown in FIG. 1A, the terminal may collect touch operations on session information in a session interface and transmit the touch operations to the server, and the server returns corresponding target documents to realize information exchange. As shown in FIG. 1B, the terminal may collect touch operations on session information in a session interface and transmit the touch operations to the server, and the server returns corresponding shortcut document controls to realize information exchange.

The information processing system may include an information processing apparatus. The information processing apparatus may be specifically integrated into a terminal that has a storage unit and has a microprocessor installed and therefore have computing power, such as a tablet computer, a mobile phone, a laptop computer, or a desktop computer. In FIG. 1, the terminal is Terminal A and Terminal B in FIG. 1. A variety of applications required by a user, such as IM applications with information interaction functions, may be installed in Terminal A and Terminal B. Terminal A may display session information in a session interface. The user may long press the session information to generate a touch operation. Terminal A responds to the touch operation for the session information, transmits the touch operation to the server, receives a corresponding target document returned by the server, displays the target document, acquires a target document position in the target document, and loads the session information into the target document position of the target document.

Terminal A may display session information in a session interface. The user may long press the session information to generate a touch operation. Terminal A responds to the touch operation for the session information, transmits the touch operation to the server, receives a corresponding shortcut document control returned by the server, displays a document display interface, displays the received shortcut document control on the document display interface, the shortcut document control carrying a position traversal rule, determines a target document corresponding to the shortcut document control selected by the user, acquires a target document position in the target document according to the position traversal rule, and then quickly loads the session information into the target document position of the target document.

The information processing system may further include a server mainly configured to receive a touch operation sent by Terminal A or Terminal B, and return information such as a corresponding target document or shortcut document control according to the touch operation. The information processing system may further include a memory configured to store an information base. The information base may include information such as documents and shortcut document controls, so that the server can acquire the information such as documents and shortcut document controls from the memory and transmit the information to Terminal A or Terminal B.

The terminal may be, but is not limited to, a personal computer, a notebook computer, a smartphone, a tablet computer, and a portable wearable device. The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

The information processing method includes: displaying session information in a session interface; responding to a touch operation for the session information, and displaying a target document corresponding to the session interface; acquiring a target document position of the target document; and loading the session information into the target document position of the target document. Therefore, in the session interface, the session information is touched, the corresponding target document is quickly displayed, the target document position of the target document is acquired, and the session information is quickly loaded into the target document position of the target document, which greatly improves the convenience of information operations and then improves the efficiency of information processing.

The information processing method includes: displaying session information in a session interface; responding to a touch operation for the session information, and displaying a document display interface, the document display interface including at least one shortcut document control; determining a target document corresponding to a selected shortcut document control; acquiring a target document position in the target document; and loading the session information into the target document position of the target document. Therefore, during the displaying of the session interface, the session information is touched, the document display interface is quickly displayed, a corresponding target document and a corresponding target document position are determined by triggering the shortcut document control in the document display interface, and the session information is quickly loaded into the target document position of the target document, which greatly improves the convenience of information operations and then improves the efficiency of information processing.

It is to be noted that, the schematic diagram of the scenario of the information processing system shown in FIG. 1 is merely an example. The information processing system and the scenario described in the embodiments of this application are intended to illustrate the technical solutions of the embodiments of this application more clearly, which do not limit the technical solutions according to the embodiments of this application. A person of ordinary skill in the art may know that, with the evolution of the information processing system and the emergence of new service scenarios, the technical solutions according to the embodiments of this application are also applicable to similar technical problems.

Detailed descriptions are separately performed below. The sequence numbers of the following embodiments are not intended to limit preference orders of the embodiments.

Embodiment 1

In this embodiment, description is given from the perspective of an information processing apparatus. The information processing apparatus may be specifically integrated into a terminal that has a storage unit and has a microprocessor installed and therefore has computing power, such as a tablet computer and a mobile phone.

Figure 2:
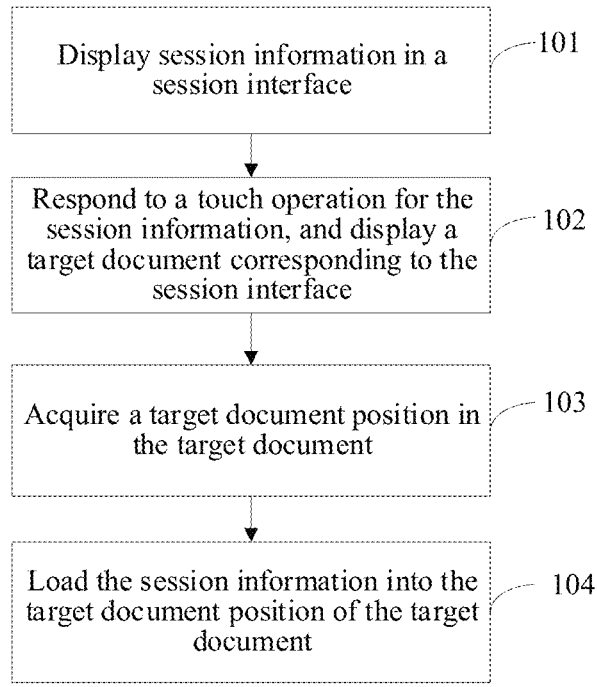
FIG. 2 is a schematic flowchart of an information processing method according to an embodiment of this application.

Referring to FIG. 2, FIG. 2 is a schematic flowchart of an information processing method according to an embodiment of this application. The information processing method includes the following steps.

In step 101, session information in a session interface is displayed.

A terminal may display a session interface for multi-user chats. The session information including a plurality of messages may be displayed on the session interface in the form of a bubble dialog box. Each piece of session information is associated with a corresponding client user. The user may double click/tap or long press the session information to generate a touch operation on the corresponding session information.

In step 102, a touch operation for one of the plurality of messages of the session information is responded to, and a target document corresponding to the session interface is displayed.

The session interface may be pre-associated with a target document. A corresponding touch operation is generated when the user double clicks/taps or long presses the session information. The terminal may respond to the touch operation for the session information and directly display the corresponding associated target document.

In some implementations, the session interface may be pre-associated with a plurality of target documents. A corresponding touch operation is generated when the user double clicks/taps or long presses the session information. A document interface may be displayed. The document interface displays the plurality of target documents associated therewith. A corresponding target document is determined and displayed according to a user selection.

In step 103, a target document position in the target document is acquired.

The target document position may be selected by row or column traversal according to a position traversal rule, or a document position selected by the user or corresponding to a mouse cursor position may be directly determined as the corresponding target document position.

In step 104, at least the one of the plurality of messages of the session information, which is a target of the touch operation, is loaded into the target document position of the target document.

A storage module of the target document may be connected to a storage module of a server. The storage module may be a database or a cloud storage unit, and may transmit the session information and the target document position to the server, so that the server can store the session information in the storage module to a target document position of a target document in the cloud. In some implementations, in order to facilitate subsequent viewing of the user, the server may generate a thumbnail interface corresponding to the session information and save and display the thumbnail interface in the target document position.

As can be seen from the above, in the embodiment of this application, the information processing method includes: acquiring session information in a session interface; responding to a touch operation for the session information, and displaying a target document corresponding to the session interface; acquiring a target document position of the target document; and loading the session information into the target document position of the target document. Therefore, in the session interface, the session information is touched, the corresponding target document is quickly displayed, the target document position of the target document is acquired, and the session information is quickly loaded into the target document position of the target document, which greatly improves the convenience of information operations and then improves the efficiency of information processing.

Embodiment 2

In this embodiment, description is given from the perspective of an information processing apparatus. The information processing apparatus may be specifically integrated into a terminal that has a storage unit and has a microprocessor installed and therefore has computing power, such as a tablet computer and a mobile phone.

Figure 3:
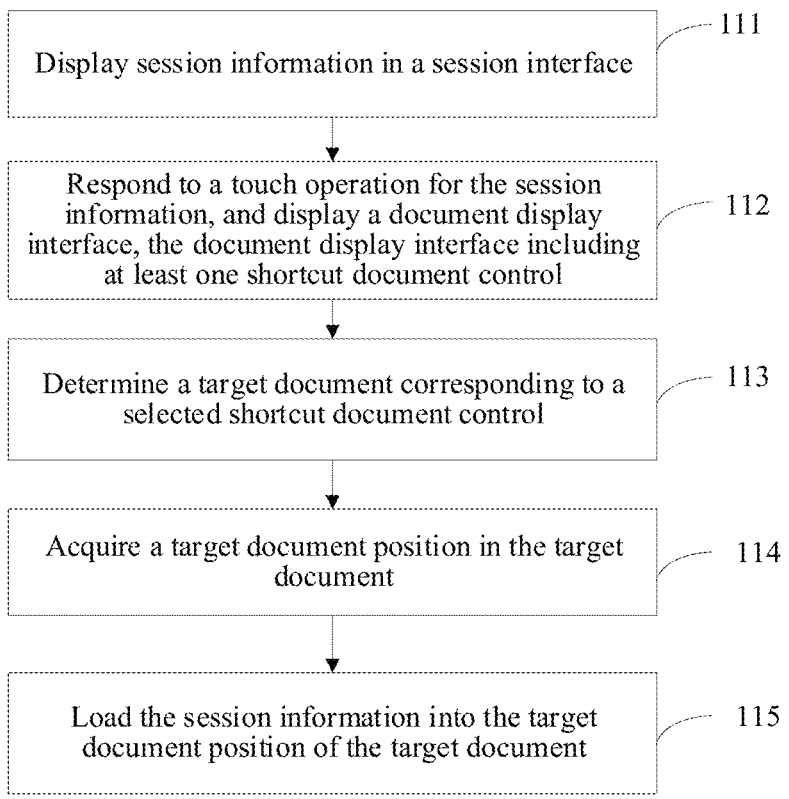
FIG. 3 is another schematic flowchart of the information processing method according to an embodiment of this application.

Referring to FIG. 3, FIG. 3 is another schematic flowchart of the information processing method according to an embodiment of this application. The information processing method includes the following steps.

In step 111, session information in a session interface is displayed.

It may be understood that an IM application is a terminal application that allows two or more users to instantly transfer text messages and files and perform voice and video communication over networks. A user may log in to the IM application to establish a real-time communication service of chats with other users. That is, real-time communication can be performed through a session interface. The session interface refers to an interface for two or more users to chat in the IM application, which supports functions of transmitting and receiving messages and processing the messages. The session information refers to content of a conversation between two or more users in the IM application, including information in a variety of formats such as text, emoticons, pictures, videos, and links. The user may log in to the IM application by entering a login ID. After the login to the IM application, the corresponding session interface can be opened.

A terminal may display a session interface for multi-user chats. The session information may be displayed on the session interface in the form a bubble dialog box. Each piece of session information is associated with a corresponding client user. The user may double click/tap or long press the session information to generate a touch operation on the corresponding session information.

In step 112, a touch operation for one of the IM messages of the session information is responded to, and a document display interface is displayed, the document display interface including at least one shortcut document control.

A corresponding touch operation is generated when the user double clicks/taps or long presses the session information. The terminal may respond to the touch operation for the session information, call out a bottom operation panel, display a document display control on the bottom operation panel, and enter a session information selection mode. The user may select a single piece of session information or a plurality of pieces of session information based on the session information selection mode. The document display control is an entry to the document display interface.

Further, the document display interface is displayed when the document display control is triggered. The document display interface may include at least one shortcut document control. The shortcut document control is a shortcut operation path to add session information from a session interface to a document. The shortcut document control may carry a corresponding position traversal rule. The position traversal rule may be a document name, a worksheet name, and a row/column traversal path. The position traversal rule is used for quickly finding a target document position into which the session information is inserted.

In some implementations, the document display interface further includes at least one document control, and the step of displaying a document display interface may include:

(1) acquiring a session ID of the session interface and a login ID currently logged in;
(2) transmitting the session ID to a server, so that the server returns candidate documents matching the session ID and corresponding shortcut document information;
(3) determining the candidate document whose login ID has an edit permission as an intermediate document, and generating a document control corresponding to the intermediate document;
(4) acquiring intermediate shortcut document information corresponding to the intermediate document, and determining a target worksheet corresponding to the intermediate document based on the intermediate shortcut document information;
(5) generating a shortcut document control according to the intermediate shortcut document information corresponding to the intermediate document when the login ID has an edit permission for the target worksheet corresponding to the intermediate document; and
(6) loading the document control and the shortcut document control to the document display interface for display.

The server can store an online document (also known as a cloud document). The online document is a document that can be simultaneously edited by a plurality of clients. The online document may be in the form of a text document, an online edit document, an online table, an online slideshow, an online collection table, an online folder, or the like. Each session interface includes a unique session ID, and the session interface may be associated with at least one document. For example, an XX group may be associated with an online edit document. In this way, the session ID of the session interface and a login ID logged in by a current client, and the session ID is transmitted to the server, so that the server returns candidate documents associated with the session ID and corresponding shortcut document information.

Further, in the embodiment of this application, a plurality of clients can simultaneously add session information to a same table. A client, after receiving the candidate documents and the corresponding shortcut document information, further needs to verify an edit permission of the login ID of the current client, determine the candidate document whose login ID has an edit permission as an intermediate document, where the intermediate document is an online document that can be viewed by a client currently logging in, and generate a document control corresponding to the intermediate document. The user can open, through the document control, the intermediate document for viewing. The intermediate document may be an online document. The online document can support multi-terminal collaborative editing, which may be an online collaborative document and support multiple users to collaboratively edit the target document online at the same time, so as to improve editing efficiency.

The intermediate document has a plurality of worksheets, the shortcut document control can be used for adding session information to a target worksheet, and the intermediate shortcut document information may indicate the target worksheet to which the session information is to be added in the plurality of worksheets corresponding to the intermediate document. Therefore, a shortcut document control is generated according to the intermediate shortcut document information when the login ID has an edit permission for the target worksheet corresponding to the intermediate document. In a case that the login ID has no edit permission for the target worksheet corresponding to the intermediate document, the shortcut document control corresponding to the target worksheet corresponding to the intermediate document cannot be generated, and the login ID currently logged in can only view the intermediate document through the document control or edit the intermediate document in the table display interface.

Finally, the document control and the shortcut document control are loaded to the document display interface and displayed.

In step 113, a target document corresponding to a selected shortcut document control is determined.

The document display interface may display at least one shortcut document control. The shortcut document control may indicate a corresponding document name, a worksheet name, and a row/column traversal path. The user clicks/taps a desired shortcut document control as required. The terminal can quickly determine a target document corresponding to the shortcut document control according to the shortcut document control selected by the user.

In step 114, a target document position in the target document is acquired.

The terminal, after determining the target document corresponding to the shortcut document control, may quickly determine a target worksheet in the target document according to the position traversal rule carried in the shortcut document control, and then traverse the target worksheet according to the row/column traversal path to find the target document position in the target worksheet, without the need to open the target document for selection, which saves operation steps and improves the efficiency of information processing.

In some implementations, the terminal, after determining the target document corresponding to the selected shortcut document control, may open a preset worksheet in the target document to quickly find the target document position according to a user selection or mouse cursor position.

In some implementations, the shortcut document control carries a position traversal rule, the position traversal rule indicating a target worksheet and a traversal path, and the step of acquiring a target document position in the target document may include:

(1) locating a target worksheet of the target document according to the position traversal rule;

(2) performing sequential traversal in the target worksheet according to the traversal path; and (3) determining a first blank cell during the sequential traversal according to the traversal path as the target document position.

Since the position traversal rule indicates a target worksheet and a traversal path, the target worksheet of the target document can be quickly located according to the position traversal rule. Sequential traversal is performed in the target worksheet according to the traversal path. The traversal path may be a traversal path based on preset rows or preset columns.

Further, traversal is started based on a traversal path of preset rows or preset columns. When session information already exists on a traversed cell, the next cell is traversed until a first blank cell is traversed. The first blank cell is determined as the target document position. In this way, automatic addition can be performed easily and quickly according to a rule of preset rows or preset columns, without requiring the user to open a table file to paste each time, which greatly improves the efficiency of information processing.

In some implementations, the traversal path includes a row traversal path or a column traversal path, and the step of performing sequential traversal in the target worksheet according to the traversal path may include:

(1.1) acquiring a row start cell of the target worksheet, and performing sequential traversal according to the row traversal path based on the row start cell of the target worksheet when the traversal path is the row traversal path; or (1.2) acquiring a column start cell of the target worksheet, and performing sequential traversal according to the column traversal path based on the column start cell of the target worksheet when the traversal path is the column traversal path.

The traversal path includes a row traversal path of preset rows and a column traversal path of preset columns. A row start cell of preset rows of the target worksheet is acquired, and sequential traversal is performed according to the row traversal path based on the row start cell of the target worksheet when the traversal path is the row traversal path. Alternatively, a column start cell of the target worksheet is acquired, and sequential traversal is performed according to the column traversal path based on the column start cell of the target worksheet when the traversal path is the column traversal path.

In step 115, at least one IM messages of the session information is loaded into the target document position of the target document.

A storage module of the target document may be connected to a storage module of a server. The storage module may be a database or a cloud storage unit, and may transmit the session information and the target document position to the server, so that the server can store the session information in the storage module to a target document position of a target document in the cloud. In some implementations, in order to facilitate subsequent viewing of the user, the server may generate a thumbnail interface corresponding to the session information and save and display the thumbnail interface in the target document position.

In some implementations, the step of loading the session information into the target document position of the target document may include:

(1) generating a thumbnail interface corresponding to the session information; and (2) loading the thumbnail interface into the target document position of the target document, and saving the session information into a storage module of the target document.

The thumbnail interface corresponding to the session information may be generated. A size and display content of the thumbnail interface may be a default size and default content. The thumbnail interface and the target document position are transmitted to the server, so that the server loads the thumbnail interface into the target document position of the target document and saves the session information into the storage module of the target document in background. Complete session information can be displayed when the user subsequently clicks/taps the thumbnail interface.

As can be seen from the above, in the embodiment of this application, the information processing method includes: acquiring session information in a session interface; responding to a touch operation for the session information, and displaying a document display interface, the document display interface including at least one shortcut document control; determining a target document corresponding to a selected shortcut document control; acquiring a target document position in the target document; and loading the session information into the target document position of the target document. Therefore, in the session interface, the session information is touched, the document display interface is quickly displayed, a corresponding target document and a corresponding target document position are determined by triggering the shortcut document control in the document display interface, and the session information is quickly loaded into the target document position of the target document, which greatly improves the convenience of information operations and then improves the efficiency of information processing.

Embodiment 3

The method described according to Embodiment 2 is described below in further detail with examples.

In this embodiment, for example, the client is an IM client, and the information processing apparatus is specifically integrated into a terminal.

Figure 4:
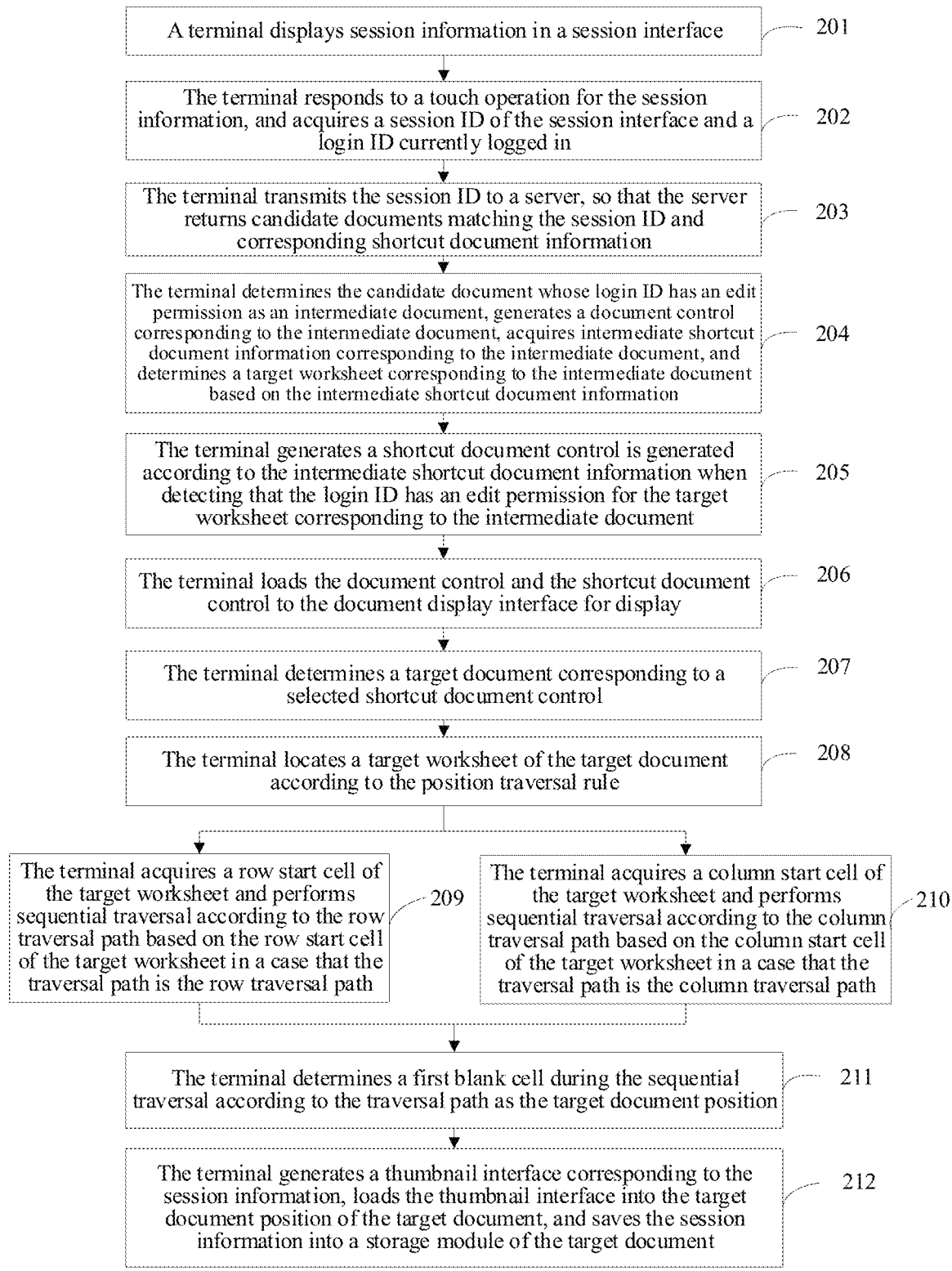
FIG. 4 is another schematic flowchart of the information processing method according to an embodiment of this application.
Figure 5:
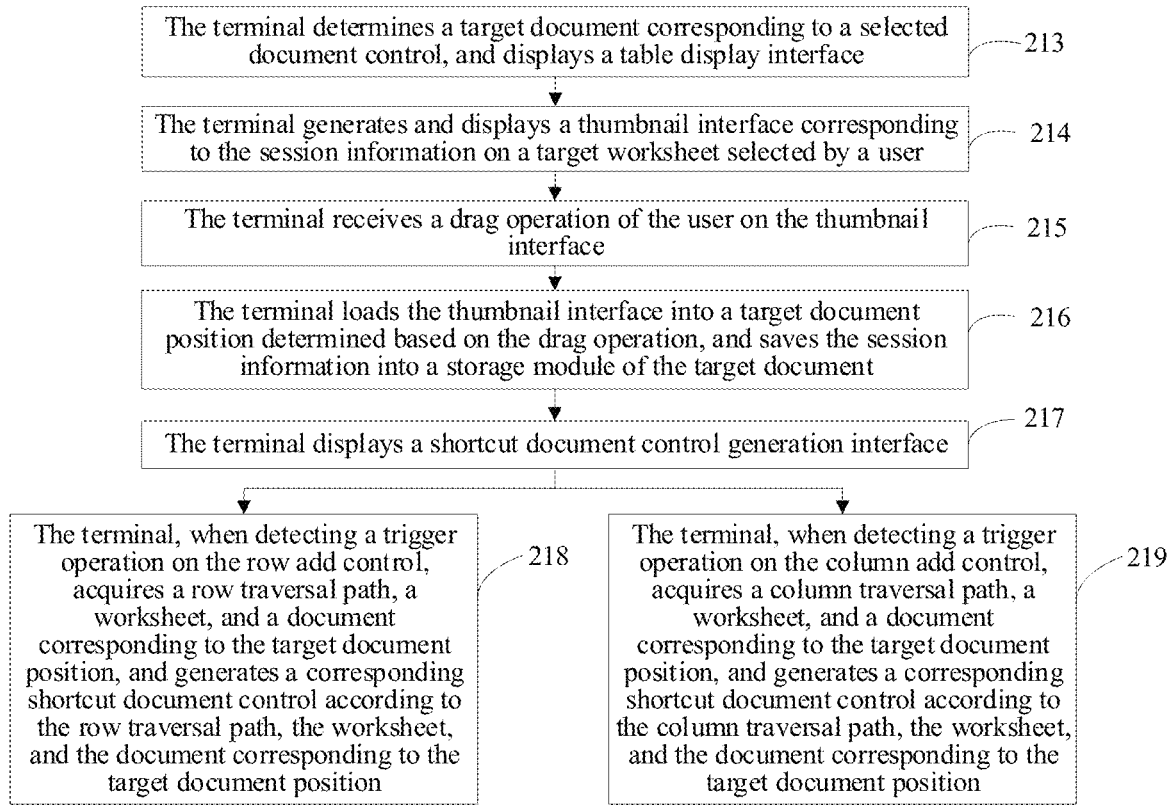
FIG. 5 is another schematic flowchart of the information processing method according to an embodiment of this application.
Figure 6:
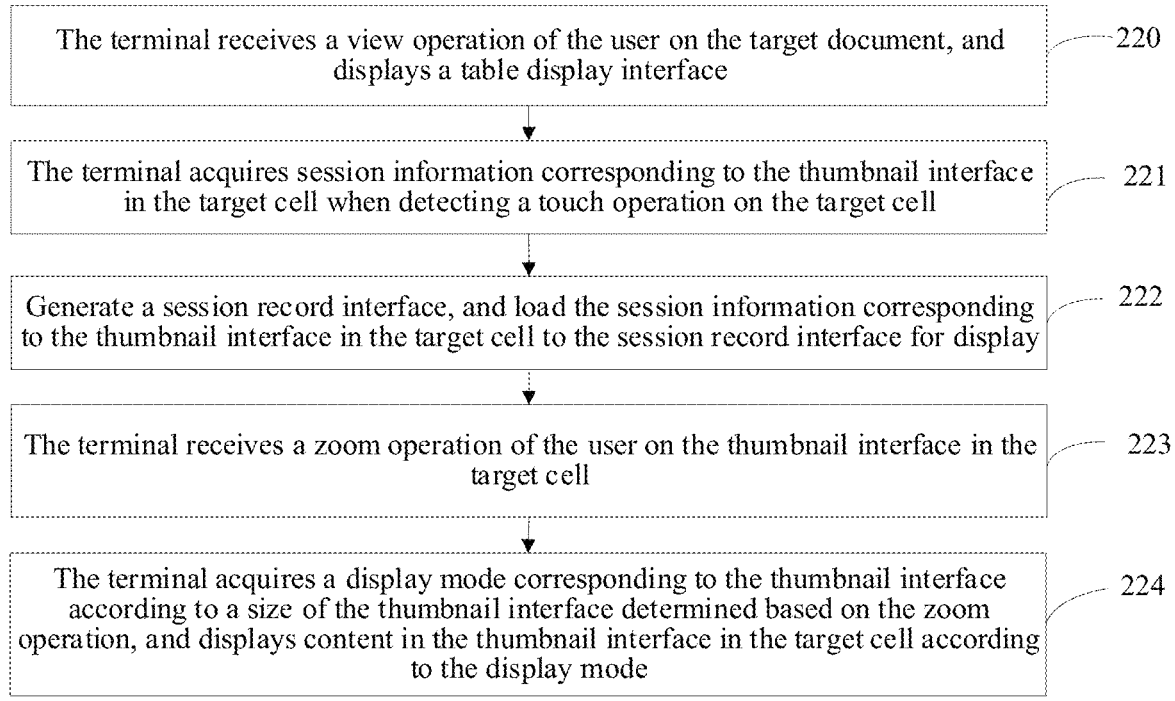
FIG. 6 is another schematic flowchart of the information processing method according to an embodiment of this application.

Referring to FIG. 4, FIG. 5, and FIG. 6 together, FIG. 4 is another schematic flowchart of the information processing method according to an embodiment of this application, FIG. 5 is another schematic flowchart of the information processing method according to an embodiment of this application, and FIG. 6 is another schematic flowchart of the information processing method according to an embodiment of this application. The flow of the method may include the following steps.

In step 201, a terminal displays session information in a session interface. In some embodiments, the session information includes a plurality of IM messages.

Figure 7A:
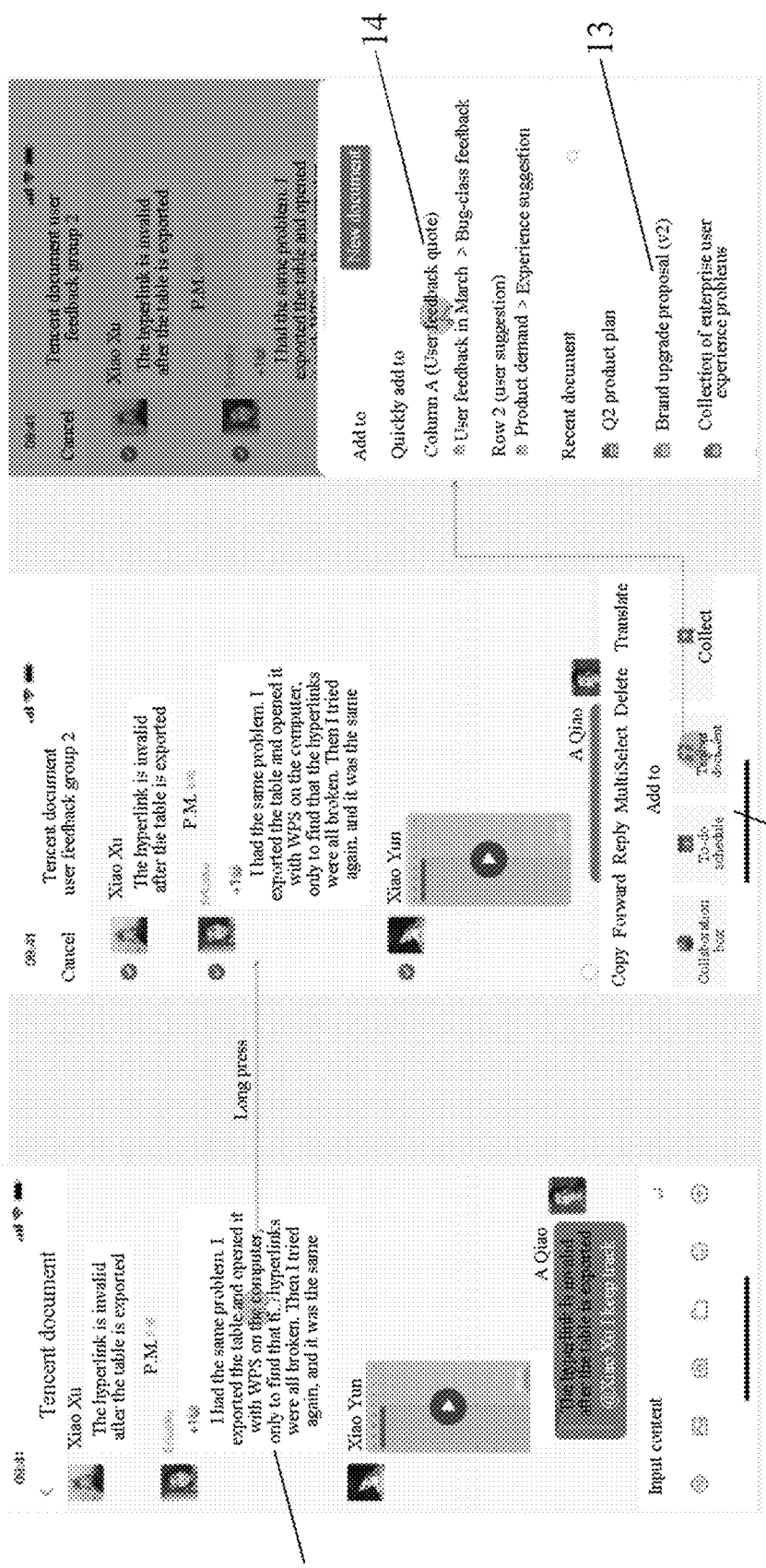
FIG. 7A is a schematic diagram of an information processing interface according to an embodiment of this application.

An IM client may be installed in the terminal. An account (i.e., a login ID) can be logged in to the IM client. Account information corresponding to the account is stored in the server. The account information may include friend information, roaming chat history information, and the like. Referring to FIG. 7A together, the terminal may open the session interface to display session information 11 in the session interface.

The user may trigger a selection mode of IM messages by double clicking or long pressing the session information 11. The user may directly select a plurality of pieces of session information and call out a bottom operation panel 12. The bottom operation panel may include a document display control "Tencent document".

In step 202, the terminal responds to a touch operation for one of the plurality of IM messages of the session information, and acquires a session ID of the session interface and a login ID currently logged in.

Referring to FIG. 7A together, the user may click/tap the document display control "Tencent document" after selecting the plurality of pieces of session information required. Each session interface is associated with a corresponding document. Therefore, the terminal can respond to the touch operation for the session information, and acquire a unique session ID of the session interface and a login ID logged in by a current client. In some implementations, a same document may be associated with a plurality of session interfaces. That is, the same document may be associated with a plurality of chat groups.

In step 203, the terminal transmits the session ID to a server, so that the server returns candidate documents matching the session ID and corresponding shortcut document information.

The terminal transmits the session ID to the server, so that the server returns candidate documents correspondingly associated with the session ID and the corresponding shortcut document information. The shortcut document information may include information such as a document name, a worksheet name, and a row/column traversal path.

In step 204, the terminal determines the candidate document whose login ID has an edit permission as an intermediate document, generates a document control corresponding to the intermediate document, acquires intermediate shortcut document information corresponding to the intermediate document, and determines a target worksheet corresponding to the intermediate document based on the intermediate shortcut document information.

The terminal first acquires the candidate document whose login ID currently logged in has an edit permission, determines the candidate document as an intermediate document, where the intermediate document may be an online document that supports multi-terminal collaborative editing, and generates a document control corresponding to the intermediate document. A corresponding document control cannot be generated for any intermediate document without any edit permission, and the client cannot display the intermediate document. The intermediate shortcut document information refers to shortcut document information corresponding to the intermediate document.

Further, documents for which shortcut document controls have been created carry shortcut document information. The shortcut document controls can be generated subsequently according to the shortcut document information. Different login IDs have different edit permissions for worksheets. In order to prevent display errors, there is a need to acquire intermediate shortcut document information corresponding to the intermediate document and determine a target worksheet corresponding to the intermediate document based on the intermediate shortcut document.

In step 205, the terminal generates a shortcut document control is generated according to the intermediate shortcut document information when detecting that the login ID has an edit permission for the target worksheet corresponding to the intermediate document.

The terminal needs to verify whether the login ID currently logged in has an edit permission for the target worksheet corresponding to the intermediate document, and may directly generate a corresponding shortcut document control according to the intermediate shortcut document information when detecting that the login ID has the edit permission for the target worksheet corresponding to the intermediate document. When it is detected that the login ID has no edit permission for the target worksheet corresponding to the intermediate document, no corresponding shortcut document control can be generated, and only the document control is displayed.

In step 206, the terminal loads the document control and the shortcut document control to the document display interface for display.

Referring to FIG. 7A together, the terminal loads the document control and displays the document control on a document interface region 13, where the document control displays a document name, and loads the shortcut document control and displays the shortcut document control on a shortcut document region 14. The shortcut document control displays a document name, a worksheet name, preset rows/columns, and headers corresponding to the preset rows/preset columns.

In step 207, the terminal determines a target document corresponding to a selected shortcut document control.

Still referring to FIG. 7A, the user may click/tap a desired shortcut document control as required, and an intermediate document corresponding to the shortcut document control selected by the user is used as a target document. The terminal may quickly determine a corresponding target document according to a document name carried in the selected shortcut document control. In some implementations, the shortcut document control may be represented as QuickPathID. The QuickPathID=fx (WorkBookID, SheetID, RowID/ColumnID), representing an association between the shortcut document control and a row/column of a particular tabular worksheet, where WorkBookID is a document ID, the SheetID is a cell ID, the RowID is a preset row ID, and the ColumnID is a preset column ID.

In step 208, the terminal locates a target worksheet of the target document according to the position traversal rule.

The position traversal rule may indicate a target worksheet and a traversal path. Therefore, the terminal can quickly locate the target worksheet of the target document according to the position traversal rule.

In step 209, the terminal acquires a row start cell of the target worksheet, and performs sequential traversal according to the row traversal path based on the row start cell of the target worksheet when the traversal path is the row traversal path.

Figure 7B:
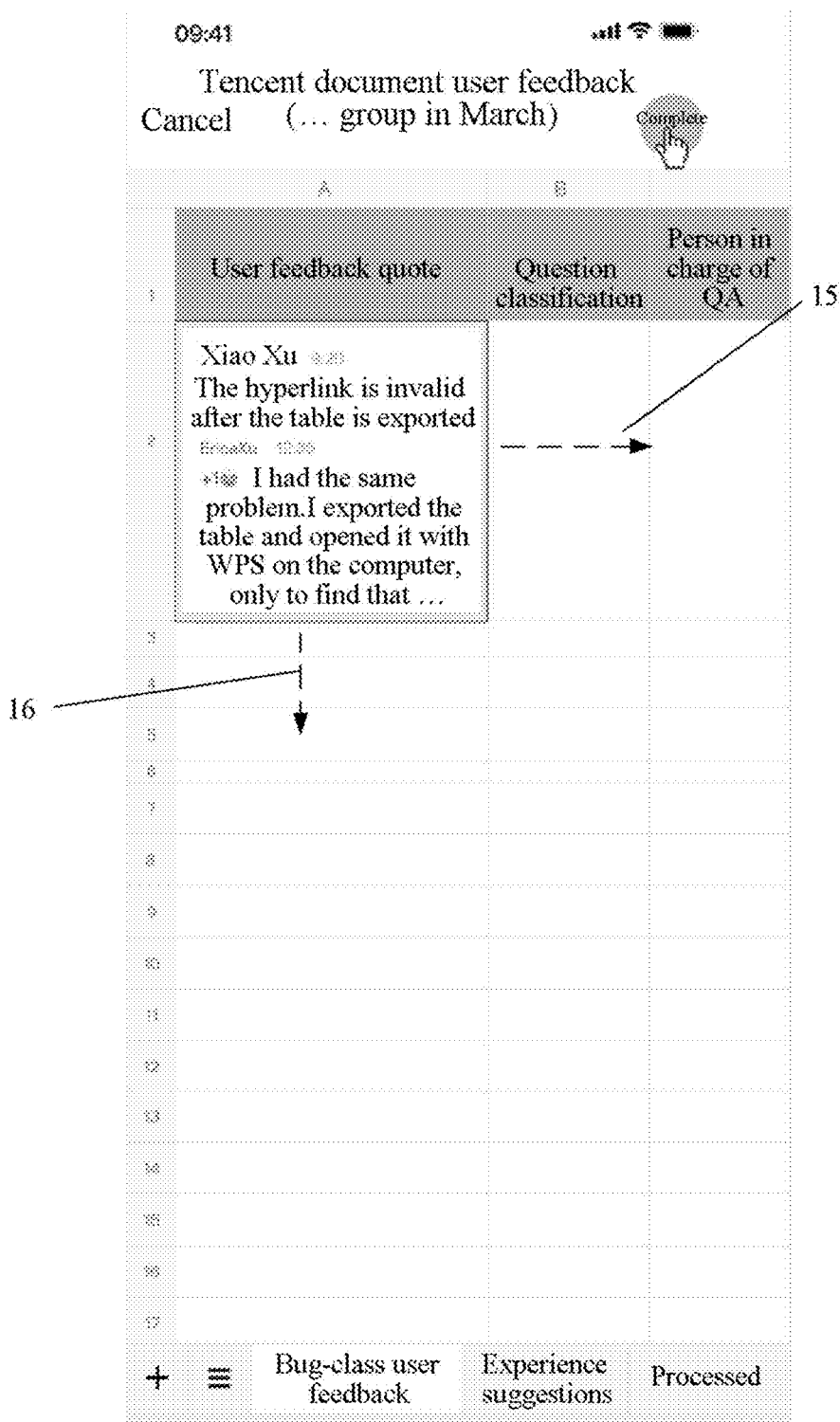
FIG. 7B is another schematic diagram of the information processing interface according to an embodiment of this application.

The traversal path includes a row traversal path or a column traversal path. Referring to FIG. 7B together, Path 15 is a row traversal path of the second row, and Path 16 is a column traversal path of Column A.

The terminal, when detecting that the traversal path is the row traversal path 15, acquires a row start cell A2 of the target worksheet, and performs sequential traversal according to the row traversal path based on the row start cell A2 of the target worksheet. The next cell to be traversed is B2, and so on.

In step 210, the terminal acquires a column start cell of the target worksheet and performs sequential traversal according to the column traversal path based on the column start cell of the target worksheet when the traversal path is the column traversal path.

Still referring to FIG. 7B, the terminal, when detecting that the traversal path is the column traversal path 16, acquires a column start cell A1 of the target worksheet, and performs sequential traversal according to the traversal path based on the column start cell A1 of the target worksheet. The next cell to be traversed is A2, and so on.

In step 211, the terminal determines a first blank cell during the sequential traversal according to the traversal path as the target document position.

Still referring to FIG. 7B, the terminal determines a first blank cell B2 during the sequential traversal according to the row traversal path as the target document position, and determines a first blank cell A3 during the sequential traversal according to the column traversal path as the target document position.

In step 212, the terminal generates a thumbnail interface corresponding to the one of the plurality of IM messages of the session information, loads the thumbnail interface into the target document position of the target document, and saves the session information into a storage module of the target document.

The terminal may generate the thumbnail interface corresponding to the one of the plurality of IM messages of the session information, and transmit the thumbnail interface and the target document position to the server, so that the server loads the thumbnail interface into the target document position of the target document and saves the session information into the storage module of the target document in background.

In step 213, the terminal determines a target document corresponding to a selected document control, and displays a table display interface.

Referring to FIG. 7A together, after the document control is loaded to the document display interface for display in step 206, the user may further click/tap a desired document control as required, and an intermediate document corresponding to the document control selected by the user is used as a target document. Still referring to FIG. 7C, the terminal may display a table display interface 17.

In step 214, the terminal generates and displays a thumbnail interface corresponding to the one of the plurality of IM messages of the session information on a target worksheet selected by a user.

Figure 7C:
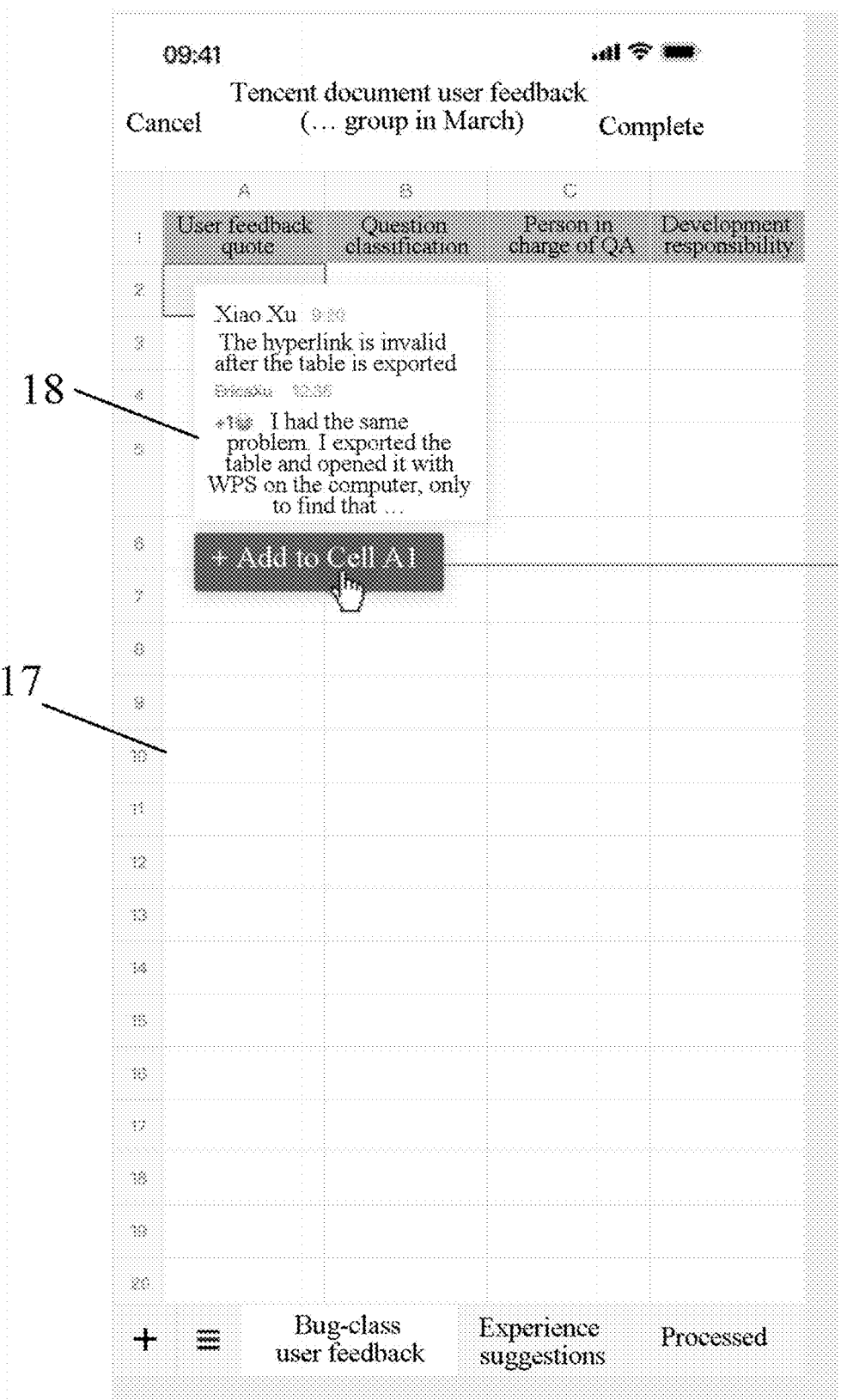
FIG. 7C is another schematic diagram of the information processing interface according to an embodiment of this application.

Referring to FIG. 7C together, the terminal generates and displays a thumbnail interface 18 corresponding to the session information on a target worksheet "Bug-class user feedback" selected by the user. The thumbnail interface 18 is of a default size and can display 6 lines of text in a thumbnail manner.

In step 215, the terminal receives a drag operation of the user on the thumbnail interface.

Referring to FIG. 7C together, the user may drag the thumbnail interface 18 by gesture so as to drag the session information to the corresponding cell. That is, the terminal receives a drag operation of the user on the thumbnail interface 18.

In step 216, the terminal loads the thumbnail interface into a target document position determined based on the drag operation, and saves the session information into a storage module of the target document.

After the user drags the thumbnail interface 18, the terminal may generate a confirmation control according to points corresponding to coordinates in an upper left corner of the thumbnail interface 18. For example, in FIG. 7C, the coordinates in the upper left corner of the thumbnail interface 18 fall into Cell A2, and a confirmation control "+ Add to Cell A2" can be generated. After the user clicks/taps the confirmation control, the thumbnail interface can be loaded to the corresponding target document position cell A2 after the drag operation for display, as shown in Cell A2 19, and the session information is saved to the storage module of the target document.

In step 217, the terminal displays a shortcut document control generation interface.

Figure 7D:
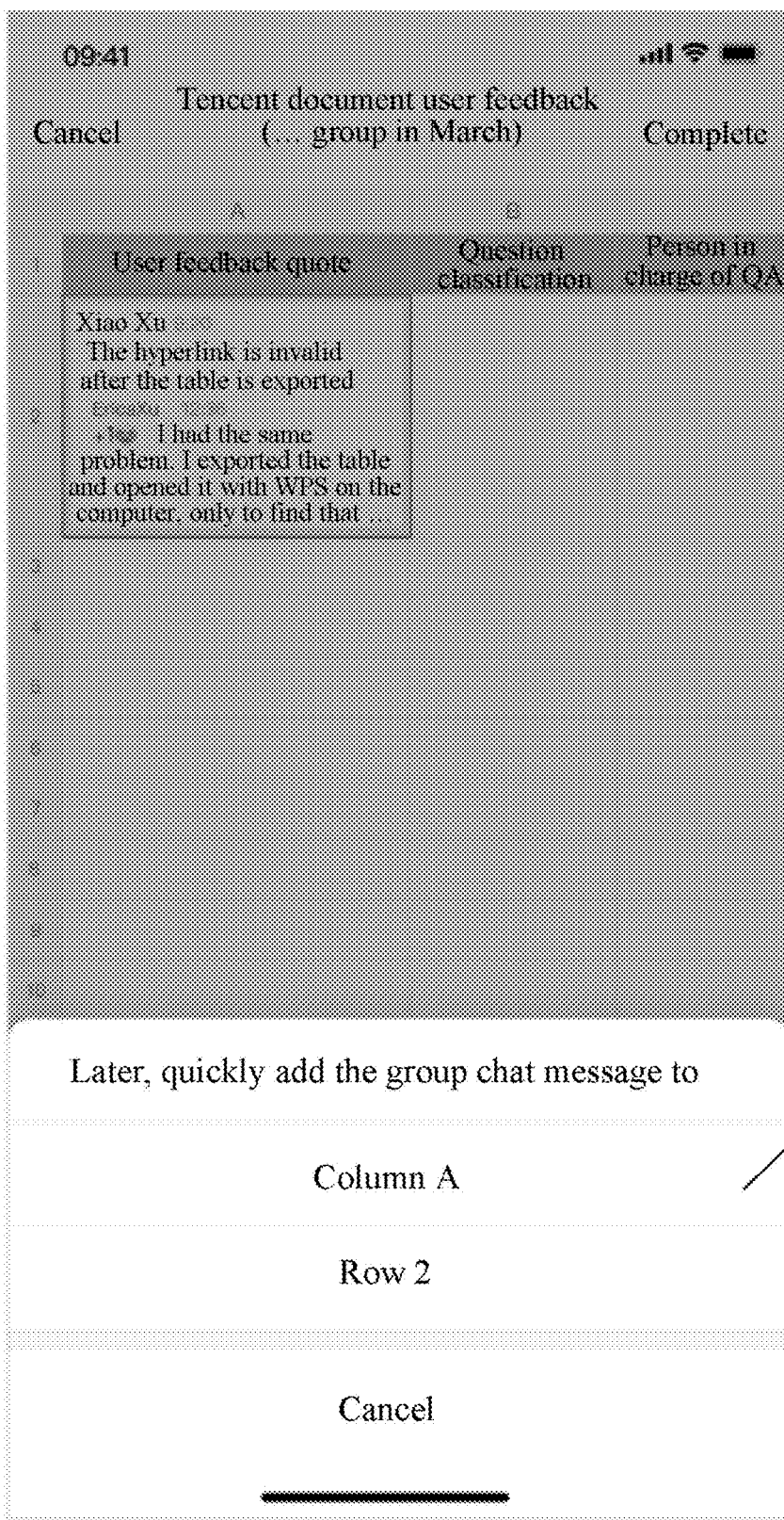
FIG. 7D is another schematic diagram of the information processing interface according to an embodiment of this application.

Referring to FIG. 7D together, assuming that the terminal enters the target worksheet "Bug-class user feedback" for the first time, a shortcut document control generation interface 20 can be displayed. The shortcut document control generation interface includes a row add control or a column add control. The row add control is displayed as "Row 2" of the target document position cell A2, and the column add control is displayed as "Column A" of the target document position cell A2.

In step 218, the terminal, when detecting a trigger operation on the row add control, acquires a row traversal path, a worksheet, and a document corresponding to the target document position, and generates a corresponding shortcut document control according to the row traversal path, the worksheet, and the document corresponding to the target document position.

Referring to FIG. 7D together, the terminal, when detecting that the row add control "Row 2" is triggered, acquires a row traversal path, i.e., Row 2 traversal path, a worksheet "Bug-class user feedback", and a document "Tencent document user feedback (group messages in March)" corresponding to Cell A2 (target document position), and generates a corresponding shortcut document control according to the row traversal path, i.e., Row 2 traversal path, the worksheet "Bug-class user feedback", and the document "Tencent document user feedback (group messages in March)" corresponding to Cell A2 (target document position).

In step 219, the terminal, when detecting a trigger operation on the column add control, acquires a column traversal path, a worksheet, and a document corresponding to the target document position, and generates a corresponding shortcut document control according to the column traversal path, the worksheet, and the document corresponding to the target document position.

Referring to FIG. 7D together, the terminal, when detecting that the column add control "Column A" is triggered, acquires a column traversal path, i.e., Column A traversal path, a worksheet "Bug-class user feedback", and a document "Tencent document user feedback (group messages in March)" corresponding to Cell A2 (target document position), and generates a corresponding shortcut document control according to the column traversal path, i.e., Column A traversal path, the worksheet "Bug-class user feedback", and the document "Tencent document user feedback (group messages in March)" corresponding to Cell A2 (target document position). In this way, all client users can quickly add session information based on an arrangement order of Row 2 or Column A through a shortcut document control, and the shortcut document control can be shared by a plurality of session interfaces and clients to achieve multi-user assistance, which further improves the efficiency of information processing.

In step 220, the terminal receives a view operation of the user on the target document, and displays a table display interface.

Referring to FIG. 7E together, the terminal may further respond to the view operation of the user on the target document at any time, and then open the target document to display the table display interface. The table display interface includes at least one target cell including a thumbnail interface. A display size of the thumbnail interface is a default display size with the shortest edge greater than 200 pixels.

In step 221, the terminal acquires at least one IM message of session information corresponding to the thumbnail interface in the target cell when detecting a touch operation on the target cell.

Referring to FIG. 7E together, the user may perform a touch operation on the target cell A2. The touch operation may be a double-click operation. The terminal acquires session information corresponding to the thumbnail interface in the target cell when detecting a touch operation on the target cell.

In step 222, a session record interface is generated, and the session information corresponding to the thumbnail interface in the target cell is loaded to the session record interface for display.

Referring to FIG. 7E together, the terminal may generate a session record interface 21, and load the session information corresponding to the thumbnail interface in the target cell A2 to the session record interface for full display.

In step 223, the terminal receives a zoom operation of the user on the thumbnail interface in the target cell.

In order to facilitate the management on the target cell, the user can also perform a zoom operation on the thumbnail interface in the target cell, that is, zoom in and out the thumbnail interface. The zoom operation may be a two-finger or mouse wheel operation, which is not specifically limited herein.

In step 224, the terminal acquires a display mode corresponding to the thumbnail interface according to a size of the thumbnail interface determined based on the zoom operation, and displays content in the thumbnail interface in the target cell according to the display mode.

Figure 7F:
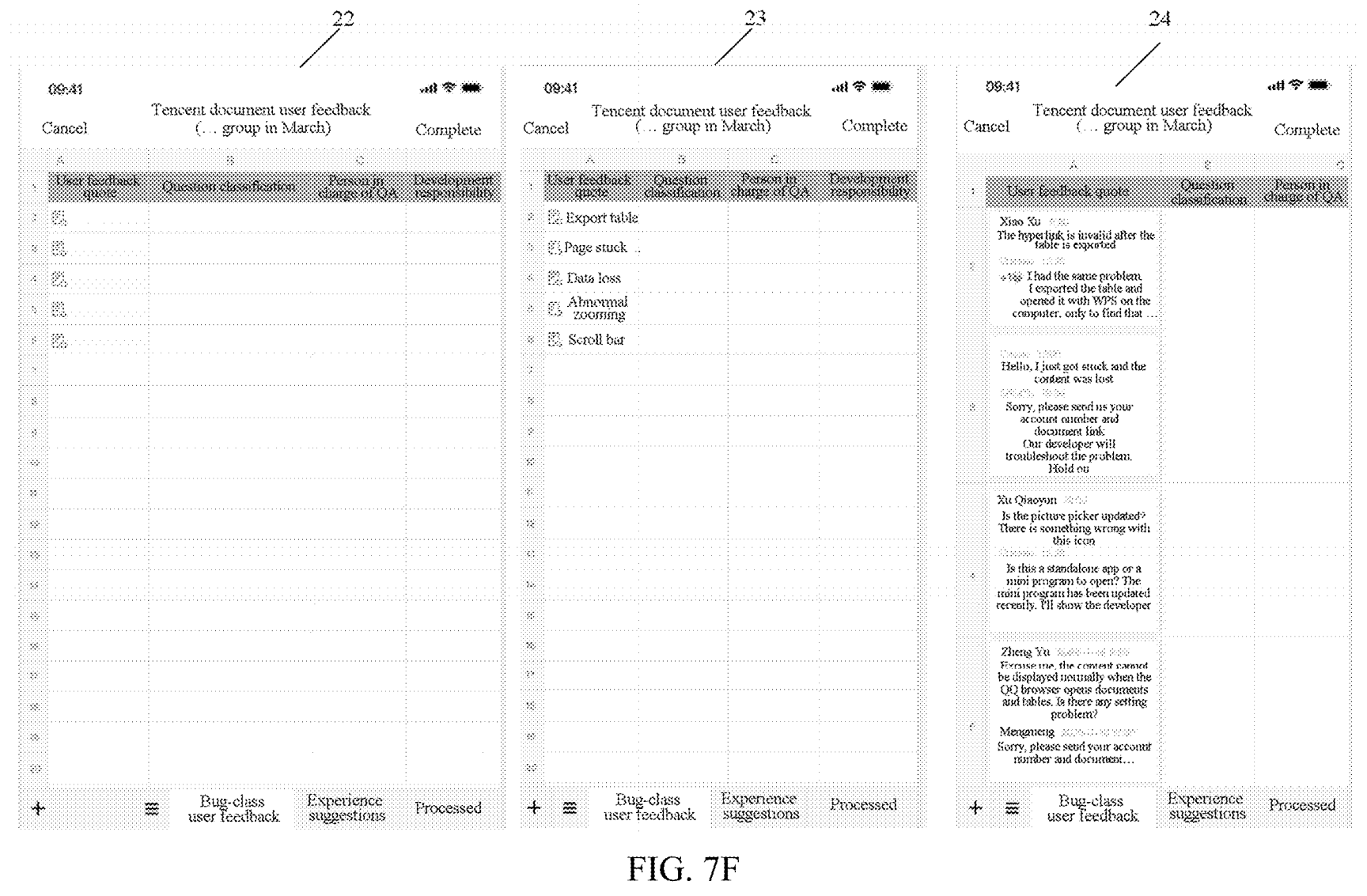

Referring to FIG. 7F together, the cell has different display modes for thumbnails in different size ranges. In some implementations, when the shortest edge of the thumbnail is less than 48 pixels, the display mode is to display icons, as shown in Document 22. When the shortest edge of the thumbnail is greater than 48 pixels and less than 200 pixels, the display mode is to display icons plus thumbnail text. The thumbnail text may be user-defined text, as shown in Document 23. When the shortest edge of the thumbnail is greater than or equal to 200 pixels, 6 lines of text are displayed in a thumbnail manner, as shown in Document 24. In this way, the terminal acquires one of the three display modes corresponding to the thumbnail interface according to the size of the thumbnail interface after the zoom operation, and displays content in the thumbnail interface in the target cell according to the display mode, which can improve information browsing efficiency based on variability of browsing forms.

As can be seen from the above, the terminal may acquire session information in a session interface; respond to the touch operation for the session information, and display a document display interface, the document display interface including at least one shortcut document control; determine a target document corresponding to a selected shortcut document control; acquire a target document position in the target document; and load the session information into the target document position of the target document. In this way, in the session interface, the session information is touched, the document display interface is quickly displayed, a corresponding target document and a corresponding target document position are determined by triggering the shortcut document control in the document display interface, and the session information is quickly loaded into the target document position of the target document, which greatly improves the convenience of information operations and then improves the efficiency of information processing.

Further, the terminal can also quickly display the table display interface through the target document control, load the session information to a required target document position according to a user drag, and display a shortcut document control generation interface after the loading, thereby flexibly generating the shortcut document control and further improving the efficiency of information processing.

Embodiment 4

In order to facilitate better implementation of the information processing method according to the embodiment of this application, an embodiment of this application further provides an apparatus based on the information processing method. Meanings of the terms are the same as those in the above information processing method. Specific implementation details can be obtained with reference to the description in the method embodiment.

Figure 8:
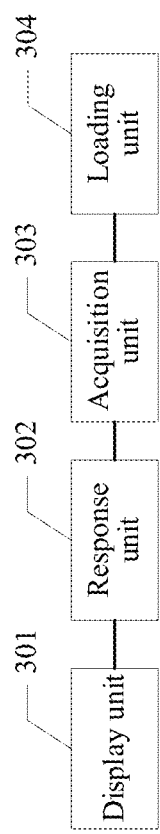
FIG. 8 is a schematic structural diagram of an information processing apparatus according to an embodiment of this application.

Referring to FIG. 8, FIG. 8 is a schematic structural diagram of an information processing apparatus according to an embodiment of this application. The information processing apparatus may include a display unit 301, a response unit 302, an acquisition unit 303, and a loading unit 304.

The display unit 301 is configured to display session information in a session interface, the session information including a plurality of messages.

The response unit 302 is configured to respond to a touch operation for one of the plurality of messages of the session information, and display a target document corresponding to the session interface.

The acquisition unit 303 is configured to acquire a target document position in the target document.

The loading unit 304 is configured to load at least the one of the plurality of messages of the session information into the target document position of the target document.

Figure 9A:
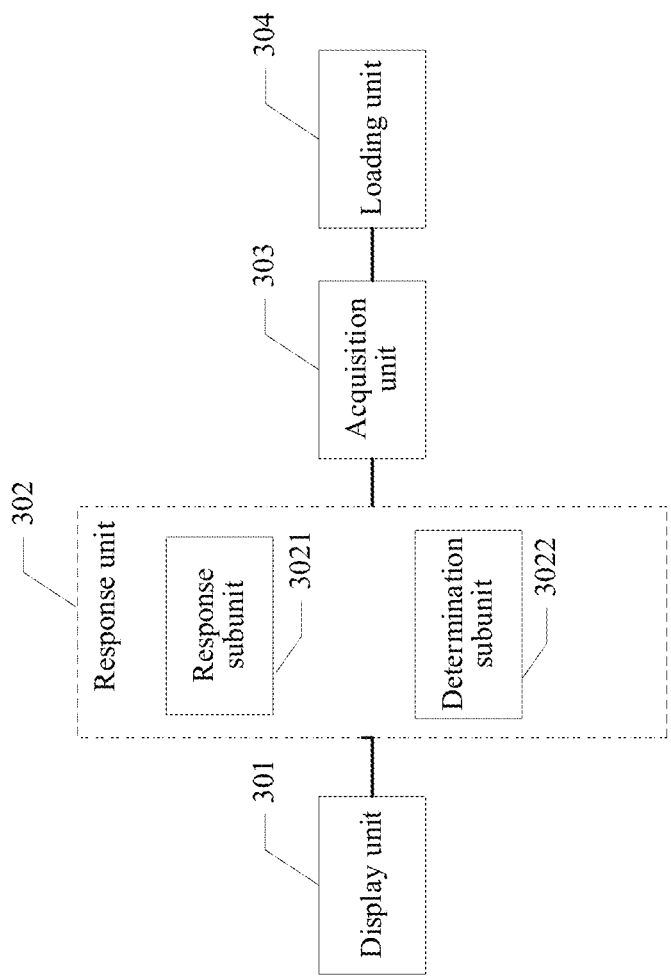
FIG. 9A is another schematic structural diagram of the information processing apparatus according to an embodiment of this application.

In some embodiments, as shown in FIG. 9A, the response unit 302 may include:

- a response subunit 3021 configured to respond to the touch operation for the session information, and display a document display interface, the document display interface including at least one shortcut document control; and
- a determination subunit 3022 configured to determine a target document corresponding to a selected shortcut document control, and display the target document. As can be seen from the above, the display unit 301 displays session information in a session interface. The response subunit 3021 responds to the touch operation for the session information, and displays a document display interface, the document display interface including at least one shortcut document control. The determination subunit 3022 determines a target document corresponding to a selected shortcut document control. The acquisition unit 303 acquires a target document position in the target document. The loading unit 304 loads the session information into the target document position of the target document. Therefore, during the displaying of the session interface, the session information is touched, the document display interface is quickly displayed, a corresponding target document and a corresponding target document position are determined by triggering the shortcut document control in the document display interface, and the session information is quickly loaded into the target document position of the target document, which greatly improves the convenience of information operations and then improves the efficiency of information processing.

In some embodiments, the response unit 302 is configured to acquire a session ID of the session interface and a login ID currently logged in; transmit the session ID to a server, so that the server returns candidate documents matching the session ID and corresponding shortcut document information; determine the candidate document whose login ID has edit permission as an intermediate document, and generate a document control corresponding to the intermediate document; acquire intermediate shortcut document information corresponding to the intermediate document, and determine a target worksheet corresponding to the intermediate document based on the intermediate shortcut document information; generate a shortcut document control according to the intermediate shortcut document information when the login ID has an edit permission for the target worksheet corresponding to the intermediate document; and load the document control and the shortcut document control to the document display interface for display.

Figure 9B:
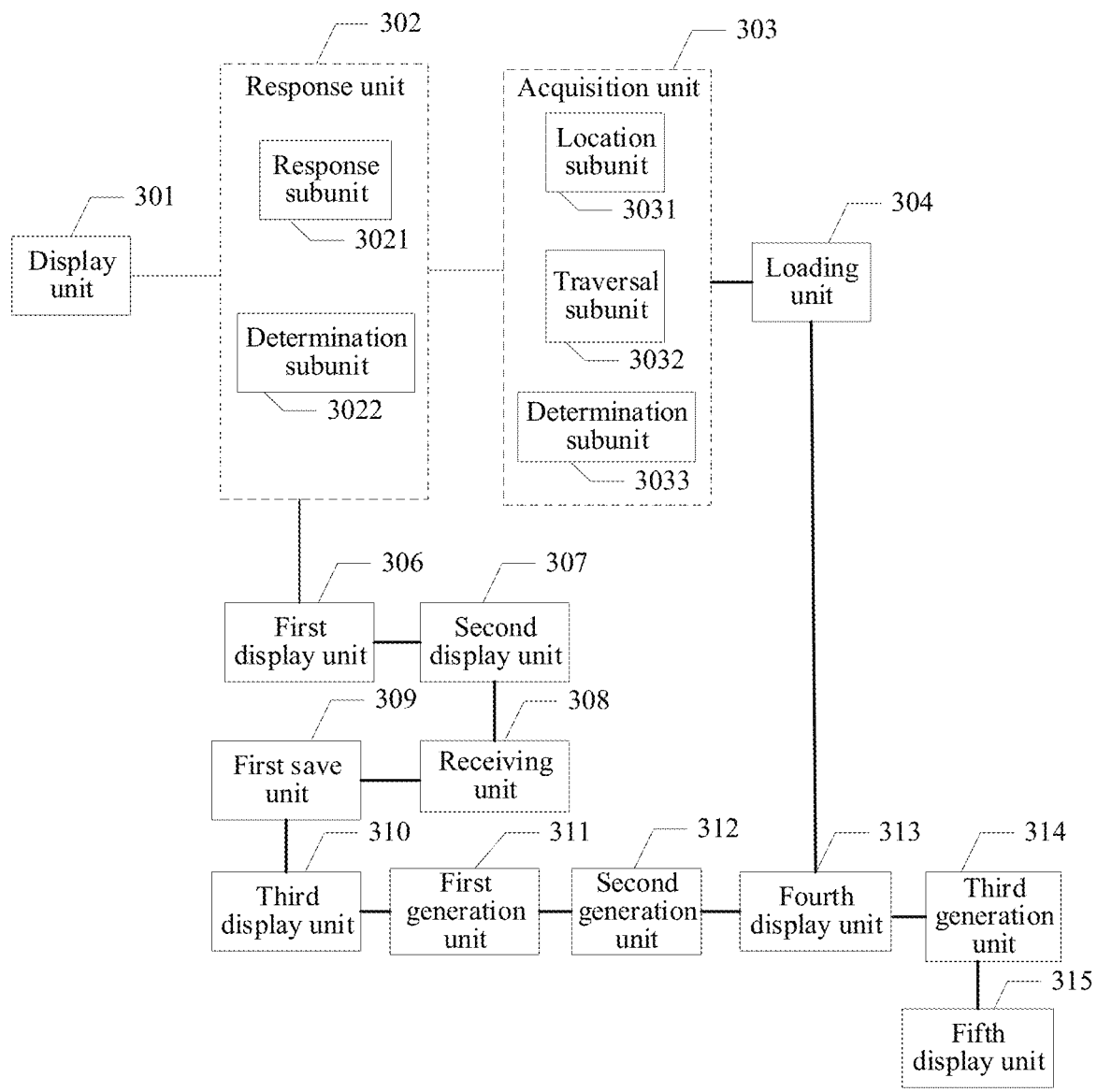
FIG. 9B is another schematic structural diagram of the information processing apparatus according to an embodiment of this application.

In some implementations, the shortcut document control carries a position traversal rule, the position traversal rule indicating a target worksheet and a traversal path. As shown in FIG. 9B, the acquisition unit 303 may include:

- a location subunit 3031 configured to locate a target worksheet of the target document according to the position traversal rule;
- a traversal subunit 3032 configured to perform sequential traversal in the target worksheet according to the traversal path; and
- a determination subunit 3033 configured to determine a first blank cell during the sequential traversal according to the traversal path as the target document position.

In some implementations, the traversal path includes a row traversal path or a column traversal path. The traversal subunit 3032 is configured to:

- acquire a row start cell of the target worksheet, and perform sequential traversal according to the row traversal path based on the row start cell of the target worksheet when the traversal path is the row traversal path; or
- acquire a column start cell of the target worksheet, and perform sequential traversal according to the column traversal path based on the column start cell of the target worksheet when the traversal path is the column traversal path.

In some implementations, the loading unit 304 is configured to: generate a thumbnail interface corresponding to the session information; and load the thumbnail interface into the target document position of the target document, and save the session information into a storage module of the target document.

In some implementations, as shown in FIG. 9B, the processing apparatus further includes:

- a first display unit 306 configured to determine a target document corresponding to a selected document control, and display a table display interface, the table display interface including at least one worksheet;
- a second display unit 307 configured to generate and display a thumbnail interface corresponding to the session information on a target worksheet selected by a user;
- a receiving unit 308 configured to receive a drag operation of the user on the thumbnail interface;
- a first save unit 309 configured to load the thumbnail interface into a target document position determined based on the drag operation, and save the session information into a storage module of the target document;
- a third display unit 310 configured to display a shortcut document control generation interface, the shortcut document control generation interface including a row add control or a column add control;
- a first generation unit 311 configured to acquire a row traversal path, a worksheet, and a document corresponding to the target document position when a trigger operation on the row add control is detected, and generate a corresponding shortcut document control according to the row traversal path, the worksheet, and the document corresponding to the target document position; or
- a second generation unit 312 configured to acquire a column traversal path, a worksheet, and a document corresponding to the target document position when a trigger operation on the column add control is detected, and generate a corresponding shortcut document control according to the column traversal path, the worksheet, and the document corresponding to the target document position;
- a fourth display unit 313 configured to receive a view operation of the user on the target document, and display a table display interface, the table display interface including at least one target cell including a thumbnail interface;
- a third generation unit 314 configured to acquire session information corresponding to the thumbnail interface in the target cell when a touch operation on the target cell is detected, generate a session record interface, and load the session information corresponding to the thumbnail interface in the target cell to the session record interface for display; and a fifth display unit 315 configured to receive a zoom operation of the user on the thumbnail interface in the target cell; acquire a display mode corresponding to the thumbnail interface according to a size of the thumbnail interface determined based on the zoom operation; and display content in the thumbnail interface in the target cell according to the display mode.

For specific implementation of the foregoing units, refer to the foregoing method embodiments, which are not described repeatedly herein.

As can be seen from the above, in the embodiment of this application, the display unit 301 displays session information in a session interface; the response unit 302 responds to a touch operation for the session information, and displays a target document corresponding to the session interface; the acquisition unit 303 acquires a target document position in the target document; and the loading unit 304 loads the session information into the target document position of the target document. Therefore, in the session interface, the session information is touched, the corresponding target document is quickly displayed, the target document position of the target document is acquired, and the session information is quickly loaded into the target document position of the target document, which greatly improves the convenience of information operations and then improves the efficiency of information processing.

Embodiment 5

An embodiment of this application further provides a computer device. The computer device may be a terminal, and an internal structure diagram thereof may be shown in FIG. 10. The terminal may include components such as a radio frequency (RF) circuit 601, a memory 602 including one or more computer-readable storage media, an input unit 603, a display unit 604, a sensor 605, an audio circuit 606, a Wireless Fidelity (WiFi) module 607, a processor 608 including one or more processing cores, a power supply 609, and the like. A person skilled in the art may understand that the structure shown in FIG. 10 does not constitute a limitation on the terminal, and may include more or fewer components than those shown in the figure, or combine some components, or have different component arrangements.

The RF circuit 601 may be configured to receive and transmit signals during an information receiving and transmitting process or a call process. Particularly, after receiving downlink information from a base station, the RF circuit delivers the downlink information to one or more processors 608 for processing, and transmits related uplink data to the base station. Generally, the RF circuit 601 includes, but not limited to, an antenna, at least one amplifier, a tuner, one or more oscillators, a subscriber identity module (SIM), a low noise card, a transceiver, a coupler, a low noise amplifier (LNA), and a duplexer. In addition, the RF circuit 601 may also communicate with a network and another device by wireless communication. The wireless communication may use any communication standard or protocol, including but not limited to Global System for Mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 602 may be configured to store a software program and a module. The processor 608 runs the software program and module that are stored in the memory 602, to implement various functional applications and information processing. The memory 602 may mainly include a program storage region and a data storage region. The program storage region may store an operating system, an application program required by at least one function (for example, a sound playback function and an image playback function), or the like. The data storage area may store data (for example, audio data and a phone book) created according to use of the terminal. In addition, the memory 602 may include a high speed random access memory, and may further include a non-volatile memory, such as at least one magnetic disk storage device, a flash memory, or another volatile solid storage device. Correspondingly, the memory 602 may further include a memory controller, so as to provide access of the processor 608 and the input unit 603 to the memory 602.

The input unit 603 may be configured to receive input digit or character information, and generate a keyboard, mouse, joystick, optical, or track ball signal input related to a user setting and function control. Specifically, in a specific embodiment, the input unit 603 may include a touch-sensitive surface and another input device. The touch-sensitive surface, which may also be referred to as a touch screen or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. In some embodiments, the touch-sensitive surface may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into a contact coordinate, then transmits the contact coordinate to the processor 608, receives and executes a command transmitted by the processor 608. In addition, the touch-sensitive surface may be implemented in a plurality of types, such as a resistive type, a capacitive type, an infrared type, and a surface acoustic wave type. In addition to the touch-sensitive surface, the input unit 603 may further include the another input device. Specifically, the another input device may include, but not limited to, one or more of a physical keyboard, a functional key (such as a volume control key or a switch key), a track ball, a mouse, and a joystick.

The display unit 604 may be configured to display information inputted by the user or provided for the user, and various graphical user interfaces of the terminal. The graphical user interfaces may be composed of graphics, text, icons, videos, and any combination thereof. The display unit 604 may include a display panel. In some embodiments, the display panel may be configured by using a liquid crystal display (LCD), an organic light-emitting diode (OLED), or the like. Further, the touch-sensitive surface may overlay the display panel. After detecting a touch operation on or near the touch-sensitive surface, the touch-sensitive surface transfers the touch operation to the processor 608 to determine a type of a touch event, and then the processor 608 provides corresponding visual output on the display panel according to the type of the touch event. Although, in FIG. 10, the touch-sensitive surface and the display panel are used as two separate components to implement input and output functions, in some embodiments, the touch-sensitive surface and the display panel may be integrated to implement the input and output functions.

The terminal may further include at least one sensor 605, such as an optical sensor, a motion sensor, and other sensors. Specifically, the optical sensor may include an ambient light sensor and a proximity sensor. The ambient light sensor may adjust brightness of the display panel according to brightness of the ambient light. The proximity sensor may switch off the display panel and/or backlight when the terminal is moved to an ear. As one type of the motion sensor, a gravity acceleration sensor may detect a value of acceleration at each direction (which generally is triaxial), may detect a value and a direction of the gravity when being static, and may be configured to identify an application of a mobile phone gesture (such as a handover between horizontal and longitudinal screens, a related game, and gesture calibration of a magnetometer), a related function of vibration identification (such as a pedometer and a knock), and the like. Another sensor, such as a gyroscope, a barometer, a hygrometer, a thermometer, and an infrared sensor, which can be configured in the terminal is not described herein again.

The audio circuit 606, a speaker, and a microphone may provide an audio interface between the user and the terminal. The audio circuit 606 may transmit, to the speaker, an electrical signal obtained through conversion of the received audio data, and the speaker converts the electrical signal into a sound signal to be outputted. According to another aspect, the microphone converts the collected sound signal into an electrical signal, the electrical signal is converted into audio data after received by the audio circuit 606, and the audio data is transmitted to another terminal through the RF circuit 601 after being outputted to the processor 608 for processing, or the audio data is outputted to the memory 602 for further processing. The audio circuit 606 may further include an earplug jack, to provide communication between a peripheral headset and the terminal.

Figure 10:
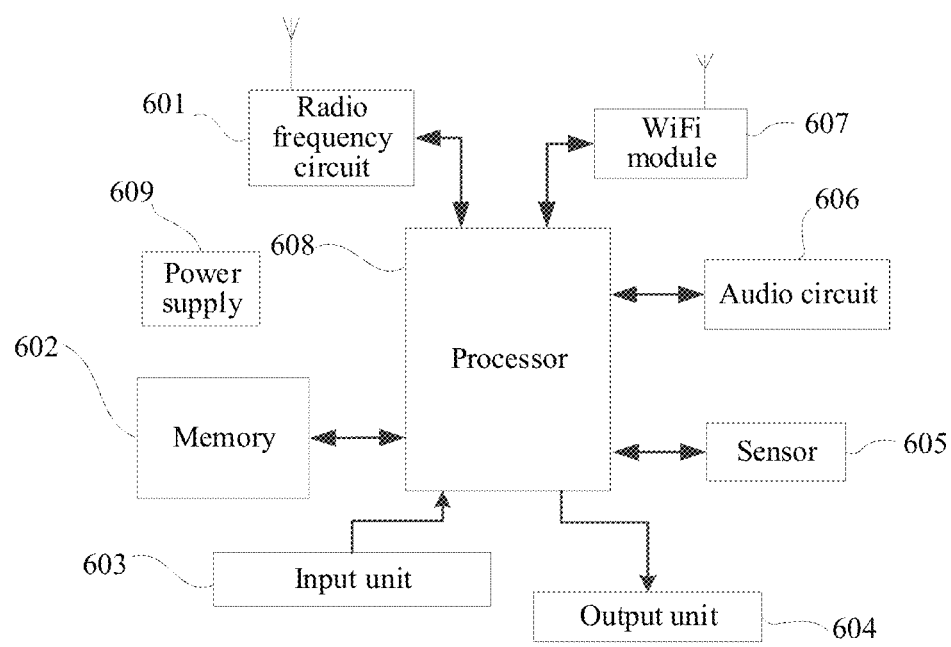
FIG. 10 is a schematic structural diagram of a computer device according to an embodiment of this application.

WiFi belongs to a short distance wireless transmission technology. The terminal may help, by using the WiFi module 607, the user transmit and receive an email, browse a webpage, and access streaming media. This provides wireless broadband Internet access for the user. Although FIG. 10 shows the WiFi module 607, it may be understood that the WiFi module is not a necessary component of the terminal, and the WiFi module may be omitted as required provided that the scope of the essence of the present invention is not changed.

The processor 608 is the control center of the terminal, and is connected to various parts of the mobile phone by using various interfaces and lines. By running or executing the software program and/or module stored in the memory 602, and invoking data stored in the memory 602, the processor performs various functions and data processing of the terminal, thereby performing overall monitoring on the mobile phone. In some embodiments, the processor 608 may include one or more processing cores. Preferentially, the processor 608 may integrate an application processor and a modem. The application processor mainly processes an operating system, a user interface, an application, and the like. The modem mainly processes wireless communication. It may be understood that the foregoing modem may either not be integrated into the processor 608.

The terminal further includes the power supply 609 (such as a battery) for supplying power to the components. Preferably, the power supply may be logically connected to the processor 608 by using a power management system, thereby implementing functions such as charging, discharging, and power consumption management by using the power management system. The power supply 609 may further include one or more of a direct current or alternating current power supply, a re-charging system, a power failure detection circuit, a power supply converter or inverter, a power supply state indicator, and any other component.

Although not shown, the terminal may further include a camera, a Bluetooth module, and the like. Details are not described herein again. Specifically, in this embodiment, the processor 608 in the terminal may load executable files corresponding to processes of one or more applications to the memory 602 according to the following instructions, and the processor 608 runs an application stored in the memory 602, to implement various functions as follows:

for example, displaying session information in a session interface; responding to a touch operation for the session information, and displaying a target document corresponding to the session interface; acquire a target document position in the target document; and loading the session information into the target document position of the target document; or displaying session information in a session interface; responding to a touch operation for the session information, and displaying a document display interface, the document display interface including at least one shortcut document control; determining a target document corresponding to a selected shortcut document control; acquiring a target document position in the target document; and loading the session information into the target document position of the target document.

In the foregoing embodiments, the descriptions of the embodiments have respective focuses. For a part that is not described in detail in an embodiment, refer to detailed description of the information processing method in the foregoing. Details are not described herein again.

As can be seen from the above, the terminal according to the embodiment of this application can touch the session information in the session interface, quickly display the corresponding target document, acquire the target document position of the target document, and quickly load the session information into the target document position of the target document, which greatly improves the convenience of information operations and then improves the efficiency of information processing. Specifically, during the displaying of the session interface, the session information is touched, the document display interface is quickly displayed, a corresponding target document and a corresponding target document position are determined by triggering the shortcut document control in the document display interface, and the session information is quickly loaded into the target document position of the target document, which greatly improves the convenience of information operations and then improves the efficiency of information processing.

Embodiment 6

A person of ordinary skill in the art may understand that, all or some steps of the methods of the foregoing embodiments may be implemented through instructions, or implemented through instructions controlling relevant hardware, and the instructions may be stored in a computer-readable storage medium and loaded and executed by a processor.

To this end, an embodiment of this application provides a storage medium storing a plurality of instructions. The instructions are executable by a processor to cause the processor to perform steps in any one of the information processing methods according to the embodiments of this application. For example, the instructions may perform the following steps:

displaying session information in a session interface; responding to a touch operation for the session information, and displaying a target document corresponding to the session interface; acquiring a target document position in the target document; and loading the session information into the target document position of the target document; or displaying session information in a session interface; responding to a touch operation for the session information, and displaying a document display interface, the document display interface including at least one shortcut document control; determining a target document corresponding to a selected shortcut document control; acquiring a target document position in the target document; and loading the session information into the target document position of the target document.

In an embodiment, a computer device is provided, including: a memory and one or more processors, the memory storing computer-readable instructions, the one or more processors, when executing the computer-readable instructions, implementing the steps in the foregoing method embodiments.

In an embodiment, one or more computer-readable storage media are provided, storing computer-readable instructions, the computer-readable instructions, when executed by one or more processors, causing the one or more processors to implement the steps in the foregoing method embodiments.

According to an aspect of this application, a computer program product or a computer program is provided, the computer program product or the computer program including computer-readable instructions, the computer-readable instructions being stored in a computer-readable storage medium. A processor of a computer device reads the computer instructions from the computer-readable storage medium, and the processor executes the computer-readable instructions, so that the computer device performs the method in the various implementations of the foregoing embodiments.

For specific implementation of the foregoing operations, reference may be made to the foregoing embodiments. Details are not described herein again.

The storage medium may include: a read-only memory (ROM), a random access memory (RAM), a magnetic disk, an optical disc or the like.

The instructions stored in the storage medium may perform steps in any one of the information processing methods according to the embodiments of this application. Therefore, beneficial effects that can be achieved by any one of the information processing methods according to the embodiments of this application can be achieved, and details can be obtained with reference to the foregoing embodiments. Details are not described herein.

The information processing method and apparatus, the computer device, and the storage medium according to the embodiments of this application are introduced above in detail. Although the principles and implementations of this application are described by using specific examples in this specification, the descriptions of the foregoing embodiments are merely intended to help understand the method and the core idea of this application. Meanwhile, a person of ordinary skill in the art may make modifications to the specific implementations and application scopes according to the ideas of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. In conclusion, the content of the specification should not be construed as a limitation to this application.

What is claimed is:

1. An information processing method performed by a computer device, the method comprising:
    displaying session information in a session interface, the session information including a plurality of messages;
    in response to detecting a touch operation on a first message of the plurality of messages of the session information, displaying a document display interface, the document display interface including a shortcut document control; and
    in response to user selection of the shortcut document control:
        determining a target worksheet corresponding to the shortcut document control and displaying the target worksheet;
        acquiring a target cell position in the target worksheet; and
        loading at least the first message of the plurality of messages of the session information into the target cell position in the target worksheet, including:
            generating a thumbnail interface corresponding to the at least the first message of the plurality of messages of the session information;
            loading the thumbnail interface into the target cell position in the target worksheet; and
            saving the at least the first message of the plurality of messages of the session information into a storage module of the target worksheet.

2. The method according to claim 1, wherein the shortcut document control carries a position traversal rule, the position traversal rule indicating the target worksheet and a traversal path, and acquiring the target cell position in the target worksheet comprises:
    locating the target worksheet according to the position traversal rule; and
    determining a first blank cell according to the traversal path as the target cell position.

3. The method according to claim 2, wherein the traversal path comprises a row traversal path or a column traversal path, and the determining a first blank cell according to the traversal path as the target cell position comprises:
    acquiring a row start cell of the target worksheet, and performing sequential traversal according to the row traversal path from the row start cell of the target worksheet until the first blank cell is identified when the traversal path is the row traversal path; or
    acquiring a column start cell of the target worksheet, and performing sequential traversal according to the column traversal path from the column start cell of the target worksheet until the first blank cell is identified when the traversal path is the column traversal path.

4. The method according to claim 1, wherein the document display interface further comprises at least one document control, and the method further comprises:
- determining the target worksheet corresponding to a selected document control, and displaying a table display interface, the table display interface comprising at least one worksheet;
- displaying the thumbnail interface corresponding to the at least the first message of the plurality of messages of the session information;
- receiving a drag operation on the thumbnail interface; and
- loading the thumbnail interface into the target cell position determined based on the drag operation, and saving the at least the first message of the plurality of messages of the session information into a storage module of the target worksheet.

5. The method according to claim 4, wherein displaying the document display interface comprises:
- acquiring a session ID of the session interface and a login ID currently logged in to the session interface;
- transmitting the session ID to a server, so that the server returns candidate documents matching the session ID and corresponding shortcut document information;
- determining, from the candidate documents, a first candidate document as an intermediate document based on the login ID having an edit permission to edit the first candidate document, and generating a document control corresponding to the intermediate document;
- acquiring intermediate shortcut document information corresponding to the intermediate document, and determining that the target worksheet corresponds to the intermediate document based on the intermediate shortcut document information;
- generating a shortcut document control according to the intermediate shortcut document information when the login ID has an edit permission for the target worksheet corresponding to the intermediate document; and
- loading the document control and the shortcut document control to the document display interface for display.

6. The method according to claim 4, wherein after the loading the thumbnail interface into the target cell position determined based on the drag operation, and saving the at least the first message of the plurality of messages of the session information into the storage module of the target worksheet, the method further comprises:
- displaying a shortcut document control generation interface, the shortcut document control generation interface comprising a row add control or a column add control;
- acquiring a row traversal path, a worksheet, and a document corresponding to the target cell position when a trigger operation on the row add control is detected;
- generating a corresponding shortcut document control according to the row traversal path, the worksheet, and the document corresponding to the target cell position; or
- acquiring a column traversal path, a worksheet, and a document corresponding to the target cell position when a trigger operation on the column add control is detected; and
- generating a corresponding shortcut document control according to the column traversal path, the worksheet, and the document corresponding to the target cell position.

7. The method according to claim 1, wherein the method further comprises:
- receiving a view operation on the target worksheet, and displaying a table display interface, the table display interface comprising at least one target cell comprising the thumbnail interface;
- acquiring the at least first message of session information corresponding to the thumbnail interface in the target cell when a touch operation on the target cell is detected; and
- generating a session record interface, and loading the at least first message of the session information corresponding to the thumbnail interface in the target cell to the session record interface for display.

8. The method according to claim 7, wherein after receiving the view operation on the target worksheet and displaying the table display interface, the method further comprises:
- receiving a zoom operation on the thumbnail interface in the target cell;
- acquiring a display mode corresponding to the thumbnail interface according to a size of the thumbnail interface determined based on the zoom operation; and
- displaying content in the thumbnail interface in the target cell according to the display mode, the content in the thumbnail interface including the at least one message of the session information corresponding to the thumbnail interface.

9. A computer device, comprising a memory and one or more processors, the memory storing computer-readable instructions, the computer-readable instructions, when executed by the one or more processors, cause the one or more processors to implement an information processing method, the method comprising:
- displaying session information in a session interface, the session information including a plurality of messages;
- in response to detecting a touch operation on a first message of the plurality of messages of the session information, displaying a document display interface, the document display interface including a shortcut document control; and
- in response to user selection of the shortcut document control:
  - determining a target worksheet corresponding to the shortcut document control and displaying the target worksheet;
  - acquiring a target cell position in the target worksheet; and
  - loading at least the first message of the plurality of messages of the session information into the target cell position in the target worksheet, including:
    - generating a thumbnail interface corresponding to the at least the first message of the plurality of messages of the session information;
    - loading the thumbnail interface into the target cell position in the target worksheet; and
    - saving the at least the first message of the plurality of messages of the session information into a storage module of the target worksheet.

10. The computer device according to claim 9, wherein the shortcut document control carries a position traversal rule, the position traversal rule indicating the target worksheet and a traversal path, and acquiring the target cell position in the target worksheet comprises:
- locating the target worksheet according to the position traversal rule; and
- determining a first blank cell according to the traversal path as the target cell position.

11. The computer device according to claim 10, wherein the traversal path comprises a row traversal path or a column traversal path, and the determining a first blank cell according to the traversal path as the target cell position comprises:
  acquiring a row start cell of the target worksheet, and performing sequential traversal according to the row traversal path from the row start cell of the target worksheet until the first blank cell is identified when the traversal path is the row traversal path; or
  acquiring a column start cell of the target worksheet, and performing sequential traversal according to the column traversal path from the column start cell of the target worksheet until the first blank cell is identified when the traversal path is the column traversal path.

12. The computer device according to claim 9, wherein the document display interface further comprises at least one document control, and the method further comprises:
  determining the target worksheet corresponding to a selected document control, and displaying a table display interface, the table display interface comprising at least one worksheet;
  displaying the thumbnail interface corresponding to the at least the first message of the plurality of messages of the session information;
  receiving a drag operation on the thumbnail interface; and
  loading the thumbnail interface into the target cell position determined based on the drag operation, and saving the at least the first message of the plurality of messages of the session information into a storage module of the target worksheet.

13. The computer device according to claim 9, wherein the method further comprises:
  receiving a view operation on the target worksheet, and displaying a table display interface, the table display interface comprising at least one target cell comprising the thumbnail interface;
  acquiring the at least first message of session information corresponding to the thumbnail interface in the target cell when a touch operation on the target cell is detected; and
  generating a session record interface, and loading the at least first message of the session information corresponding to the thumbnail interface in the target cell to the session record interface for display.

14. The computer device according to claim 13, wherein after receiving the view operation on the target worksheet and displaying the table display interface, the method further comprises:

receiving a zoom operation on the thumbnail interface in the target cell;
  acquiring a display mode corresponding to the thumbnail interface according to a size of the thumbnail interface determined based on the zoom operation; and
  displaying content in the thumbnail interface in the target cell according to the display mode, the content in the thumbnail interface including the at least one message of the session information corresponding to the thumbnail interface.

15. One or more non-transitory computer-readable storage media storing computer-readable instructions, the computer-readable instructions, when executed by one or more processors of a computer device, cause the computer device to implement an information processing method, the method comprising:
  displaying session information in a session interface, the session information including a plurality of messages;
  in response to detecting a touch operation on a first message of the plurality of messages of the session information, displaying a document display interface, the document display interface including a shortcut document control; and
  in response to user selection of the shortcut document control:
    determining a target worksheet corresponding to the shortcut document control and displaying the target worksheet;
    acquiring a target cell position in the target worksheet; and
    loading at least the first message of the plurality of messages of the session information into the target cell position in the target worksheet, including:
      generating a thumbnail interface corresponding to the at least the first message of the plurality of messages of the session information;
      loading the thumbnail interface into the target cell position in the target worksheet; and
      saving the at least the first message of the plurality of messages of the session information into a storage module of the target worksheet.

* * * * *